United States Patent
Ekl et al.

(10) Patent No.: US 10,661,799 B2
(45) Date of Patent: May 26, 2020

(54) DEVICE, SYSTEM AND METHOD FOR AUTONOMOUS TACTICAL VEHICLE CONTROL

(71) Applicant: MOTOROLA SOLUTIONS, INC., Chicago, IL (US)

(72) Inventors: Randy L. Ekl, Downers Grove, IL (US); Zheng Fang, Chicago, IL (US); Eric Johnson, Chicago, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 343 days.

(21) Appl. No.: 15/855,551

(22) Filed: Dec. 27, 2017

(65) Prior Publication Data
US 2019/0193734 A1  Jun. 27, 2019

(51) Int. Cl.
*B60W 30/18* (2012.01)
*G05D 1/00* (2006.01)
*G06N 5/04* (2006.01)
*G01C 21/34* (2006.01)
*G08G 1/0965* (2006.01)
*G06Q 10/06* (2012.01)
*G08G 1/00* (2006.01)
*G06Q 50/26* (2012.01)
(Continued)

(52) U.S. Cl.
CPC ... *B60W 30/18009* (2013.01); *G01C 21/3407* (2013.01); *G05D 1/0088* (2013.01); *G06N 5/045* (2013.01); *G06Q 10/0635* (2013.01); *G06Q 10/06311* (2013.01); *G06Q 50/26* (2013.01); *G08G 1/017* (2013.01); *G08G 1/0965* (2013.01); *G08G 1/202* (2013.01); *B60W 2710/18* (2013.01); *B60W 2710/20* (2013.01); *G05D 1/0246* (2013.01); *G05D 1/0257* (2013.01)

(58) Field of Classification Search
CPC combination set(s) only.
See application file for complete search history.

(56) References Cited

U.S. PATENT DOCUMENTS

| 10,321,039 B2 * | 6/2019 | Bohlander | H04N 5/77 |
| 2004/0158476 A1 * | 8/2004 | Blessinger | G06Q 50/205 |
| | | | 434/65 |

(Continued)

FOREIGN PATENT DOCUMENTS

RU  2269449 C1  2/2006

OTHER PUBLICATIONS

ISA/EP, International Search Report and Written Opinion, dated Apr. 8, 2019, re PCT International Patent Application No. PCT/US2018/064739.

*Primary Examiner* — Bhavesh V Amin
(74) *Attorney, Agent, or Firm* — Perry + Currier, Inc.

(57) ABSTRACT

A device, system and method for autonomous tactical vehicle control is provided. Data associated with a second vehicle pursued by the first vehicle is received at a computing device associated with the first vehicle. A plurality of tactical intercept maneuvers and associated risk factors are determined using the data. A tactical intercept maneuver is selected based on the respective risk factors. The first vehicle is controlled to autonomously perform the tactical intercept maneuver and/or a notification device is controlled to provide, at the first vehicle, guidance for an operator of the first vehicle to perform the tactical intercept maneuver using the first vehicle.

20 Claims, 10 Drawing Sheets

(51) Int. Cl.
   *G08G 1/017*   (2006.01)
   *G05D 1/02*   (2020.01)

(56) References Cited

U.S. PATENT DOCUMENTS

| | | | |
|---|---|---|---|
| 2010/0214084 A1* | 8/2010 | Haste, III | B60L 1/00 340/426.11 |
| 2012/0013582 A1 | 1/2012 | Inoue et al. | |
| 2015/0153733 A1* | 6/2015 | Ohmura | G08G 1/20 701/23 |
| 2015/0260531 A1* | 9/2015 | Ehsani | G01C 21/3461 701/538 |
| 2016/0070262 A1* | 3/2016 | Kawash | A63G 25/00 701/2 |
| 2017/0124505 A1* | 5/2017 | Nakfour | H04W 4/90 |

\* cited by examiner

DEVICE, SYSTEM AND METHOD FOR AUTONOMOUS TACTICAL VEHICLE CONTROL

BACKGROUND OF THE INVENTION

Self-driving and/or autonomous vehicles are becoming increasingly ubiquitous. Generally, however, such self-driving vehicles are configured to autonomously navigate a street, and the like, while avoiding other vehicles, etc. Such autonomous navigation may not be suitable for self-driving and/or autonomous vehicles used by public safety organizations, such as police departments.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
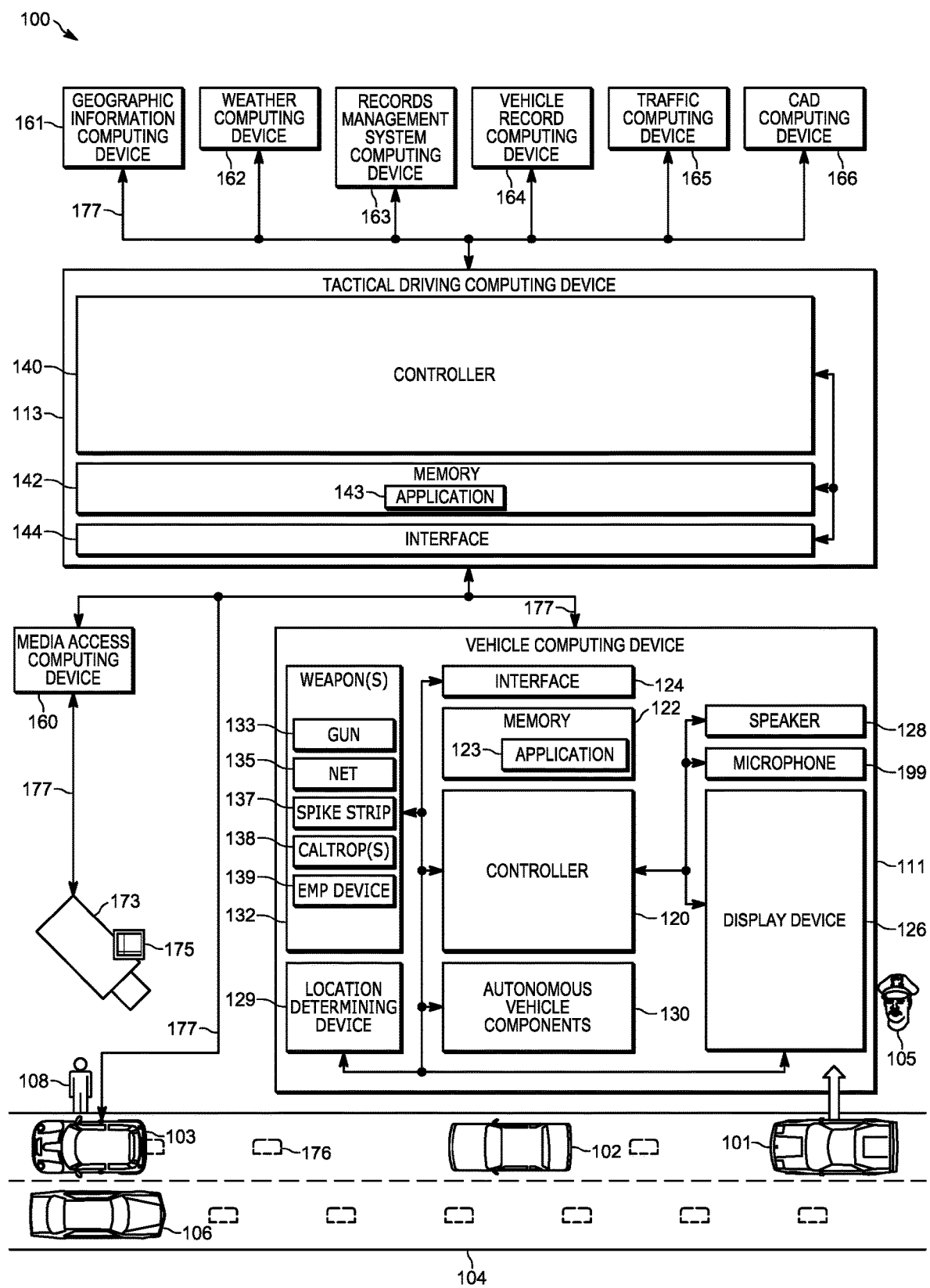
FIG. 1 is a system for autonomous tactical vehicle control in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An aspect of the specification provides a computing device comprising: a controller and a communication interface, the computing device associated with a first vehicle, the controller configured to: receive, using the communication interface, data associated with a second vehicle pursued by the first vehicle; determine, using the data associated with the second vehicle, a plurality of tactical intercept maneuvers and respective risk factors associated with the plurality of tactical intercept maneuvers; select a tactical intercept maneuver, from the plurality of tactical intercept maneuvers, based on the respective risk factors; and, one or more of: cause the first vehicle to autonomously perform the tactical intercept maneuver; and cause a notification device at the first vehicle to provide guidance for an operator of the first vehicle to perform the tactical intercept maneuver using the first vehicle.

An aspect of the specification provides a method comprising: receiving, at a controller of a computing device associated with a first vehicle, data associated with a second vehicle pursued by the first vehicle; determining, at the controller, using the data associated with the second vehicle, a plurality of tactical intercept maneuvers and respective risk factors associated with the plurality of tactical intercept maneuvers; selecting, at the controller, a tactical intercept maneuver, from the plurality of tactical intercept maneuvers, based on the respective risk factors; and, one or more of: causing, using the controller, the first vehicle to autonomously perform the tactical intercept maneuver; and, causing, using the controller, a notification device to provide at the first vehicle guidance for an operator of the first vehicle to perform the tactical intercept maneuver using the first vehicle.

Attention is directed to FIG. 1, which depicts a system 100 for autonomous tactical vehicle control. As depicted, a first vehicle 101 is pursuing a second vehicle 102. The first vehicle 101 may be a police services vehicle, and the like, and includes self-driving and/or autonomous vehicle functionality. As depicted, a third vehicle 103 may also be in pursuit of the second vehicle 102, and the third vehicle 103 also may be a police services vehicle, and the like which includes self-driving and/or autonomous vehicle functionality. However, the vehicles 101, 103 may also be manually operated, with autonomous vehicle functionality being turned on or off by an operator of a respective vehicle 101, 103; however, in other embodiments, the vehicles 101, 103 may be fully autonomous with no on-board operator.

While the present examples are described with respect to police service vehicles 101, 103 pursuing the second vehicle 102, the vehicles 101, 103 may alternatively comprise any type of public safety vehicles including, but not limited to, fire service vehicles, emergency medical service vehicles, and the like. However, the vehicles 101, 103 need not be public safety vehicles; rather the vehicles 101, 103 may be any type of vehicles that may pursue another vehicle. Indeed, while the vehicles 101, 103 are further described with respect to being automobiles, the vehicles 101, 103 may include other types of vehicles including, but not limited to, land vehicles, water vehicles, airborne vehicles, boats, drones, airplanes, tanks, and the like.

Furthermore, the terms pursuit and pursuing as described herein may include the first vehicle 101 being behind and/or following the second vehicle 102 and/or in any position relative to the second vehicle 102. For example, as depicted in FIG. 1, the third vehicle 103 may also be pursuing the second vehicle 103, however the third vehicle 103 is located in front of the second vehicle 102. Hence, as described herein, a first vehicle pursuing a second vehicle includes, but is not limited to, the first vehicle being in any position relative to the second vehicle, such that the first vehicle may one or more of apprehend, seize, intercept, and the like, the second vehicle.

In the depicted example embodiments, the first vehicle 101 may be at least partially operated by a responder 105 (either as a driver or as a passenger), such as a police officer, and the like, who is schematically depicted as being beside the first vehicle 101, though the responder 105 is understood to be inside the first vehicle 101. In general, the first vehicle 101 may need to implement one or more tactical driving maneuvers, including tactical intercept maneuvers, that may require precise, tactical driving in order to, for example, apprehend a fleeing suspect in the second vehicle 102. Different tactical driving maneuvers and/or equipment deployment choices may carry varying levels of risk and ramifications; selecting a tactical driving maneuver may require more information than the responder 105 has access to, especially when the vehicles 101, 102 are in a high-speed chase.

However, even when the vehicles 101, 102 are not in a high-speed chase, and the like, the responder 105 may be challenged in deciding on a tactical driving maneuver. For example, while as depicted, the first vehicle 101 is immediately behind the second vehicle 102 on a road 104 (and the like), the first vehicle 101 may be pursuing the second vehicle 102 in any position relative to the second vehicle 102, including, but not limited to, in front of the second vehicle 102, beside the second vehicle 102, on another street (e.g. from a concealed position), and the like. For example, as depicted, the third vehicle 103, located in front of the second vehicle 102, may also be in pursuit of the second vehicle 102.

As such, the responder 105 in the first vehicle 101 may not be able to see other traffic, such as a bystander vehicle 106 travelling in a direction opposite the vehicles 101, 102, and/or pedestrians and/or bystanders, such as the bystander 108, and/or be aware other factors that may be important when deciding to implement a tactical driving maneuver.

Hence, system 100 further includes a vehicle computing device 111 of the first vehicle 101, in communication with a tactical driving computing device 113, one or more of which are configured to determine tactical intercept maneuvers, and risk factors associated with the tactical intercept maneuvers, such that the first vehicle 101 may be automatically controlled to autonomously perform a tactical intercept maneuver selected based on the risk factors, as described in detail hereafter. While details of the third vehicle 103 are not depicted, the third vehicle 103 may be similar to the first vehicle 101 and is hence assumed to include a respective vehicle computing device in communication with the tactical driving computing device 113.

While the vehicle computing device 111 is depicted as beside the first vehicle 101, it is understood that the arrow between the vehicle computing device 111 and first vehicle 101 indicates that the vehicle computing device 111 is a component of the first vehicle 101. Indeed, as schematically depicted in FIG. 1, the vehicle computing device 111 generally comprises a vehicle operating system of the first vehicle 101 and includes a controller 120, a memory 122 storing an application 123, and a communication interface 124 (interchangeably referred to hereafter as the interface 124). The vehicle computing device 111 further includes one or more notification devices including, but not limited to, a display device 126 and a speaker 128, for example located at a dashboard, and the like, of the first vehicle 101, such that the responder 105 may view the display device 126 and hear the speaker 128 while inside and/or operating the first vehicle 101. As depicted, the vehicle computing device 111 further includes a microphone 199 which may be used to receive voice commands, voice interactions, and the like from the responder 105, such voice commands, voice interactions, and the like used to initiate tasks at the vehicle computing device 111 which may include, but are not limited to, one or more of; queries, changing mode commands (e.g. automatic vs. manual modes), selecting and/or rejecting tactical intercept maneuvers, and the like. Indeed, use of voice commands, voice interactions, and the like at the microphone 119 may enable the responder 105 to interact with vehicle computing device 111 eyes and hands free, which may important for the safety of the responder 105, such that the responder 105 may improve his or her situational awareness. It is further understood that such voice comments, voice interactions, and the like, may be received via a virtual partner and/or virtual assistant application at the vehicle computing device 111; hence, such voice comments, voice interactions, and the like, include, but are not limited to, interactions with such virtual partners and/or virtual assistants.

The display device 126 may include, but is not limited to, one or more of a flat panel display, cathode ray tube, an augmented reality display device, a heads-up display device, a virtual reality display device, and the like.

As depicted, the vehicle computing device 111 may further comprise a location determining device 129, such as a global positioning system (GPS) device, and the like, and which may include, but is not limited to, an orientation determining device for determining an orientation and/or direction of travel of the first vehicle 101, such as a magnetometer, a gyroscope, an accelerometer, and the like.

While not depicted, the vehicle computing device 111 may further comprise one or more input devices, including, but not limited to, buttons, knobs, touch screens, microphones, video capture devices (e.g. for capturing input via gestures) and the like, that enable the responder 105 to interact with the vehicle computing device 111.

The vehicle computing device 111 further comprises autonomous vehicle components 130 including, but not limited to, sensors (e.g. radar sensors, image capturing devices (e.g. cameras, still image cameras, video cameras and the like), light detection and ranging (LIDAR) sensors, and the like), steering controllers, engine controllers, braking controllers, navigation devices (which may include the location determining device 129), and the like, for implementing self-driving and/or autonomous vehicle functionality. However, the first vehicle 101 may also be operated manually by the responder 105. For example, the responder 105 may select a mode of operation of the first vehicle 101, using an input device, to switch between the first vehicle 101 being autonomously operated and manually operated.

As depicted, the vehicle computing device 111 optionally further comprises one or more weapons 132 that may be fired and/or deployed and/or operated and/or launched under control of the controller 120, for example when executing a tactical intercept maneuver at the first vehicle; such weapons 132 may include, but are not limited to a gun 133, a net 135, a spike strip 137 (e.g. a chain of spikes), caltrops 138, an electromagnetic pulse (EMP) device 139, and the like, and/or any other type of weapon that may be used in a tactical intercept maneuver, for example to stop and/or slow down the second vehicle 102. Such weapons 132 may further includes, lasers, and the like.

As depicted schematically in FIG. 1, the tactical driving computing device 113 comprises a controller 140, a memory 142 storing an application 143, and a communication interface 144 (interchangeably referred to hereafter as the interface 144). The tactical driving computing device 113 is generally configured to determine a plurality of tactical intercept maneuvers that may be implemented at the vehicle computing device 111, as well as respective risk factors for the plurality of tactical intercept maneuvers, using one or more of: a generalized linear regression algorithm; a random forest algorithm; a support vector machine algorithm; a gradient boosting regression algorithm; a decision tree algorithm; a generalized additive model; and the like. In some embodiments, the tactical driving computing device 113 may be generally configured to determine the plurality of tactical intercept maneuvers and the respective risk factors using one or more of neural network algorithms, deep learning algorithms, evolutionary programming algorithms, and the like.

However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like, in some public safety environments.

In particular, as the first vehicle 101 may be a police services vehicle, and decisions for any tactical intercept maneuver performed by the first vehicle 101 may be used as evidence in a legal proceeding. Hence, causality for selecting any tactical intercept maneuver may need to be determined for presentation in the legal proceeding. Determination of causality may be easier with generalized linear regression algorithms, random forest algorithms, support vector machine algorithms, gradient boosting regression algorithms, decision tree algorithms, generalized additive models, and the like, than with neural network algorithms, deep learning algorithms, evolutionary programming algorithms, and the like.

As depicted, the system 100 further comprises a plurality of computing devices external to the first vehicle 101, including, but not limited to, cloud computing devices and/or services, which may provide data associated with the second vehicle 102, including, but not limited to, context data associated with the second vehicle 102. Such computing devices may include, but are not limited to, a media access computing device 160, geographic information computing device 161, a weather computing device 162, a police record computing device and/or a records management system (RMS) computing device 163 (which may also store criminal records and/or data relating to criminal incidents), a vehicle record computing device 164, a traffic computing device 165, a computer aided dispatch (CAD) computing device 166, and the like.

However, other types of computing devices, which may be sources of data associated with the second vehicle 102, are within the scope of the present specification including, but not limited to, databases and/or police databases where outstanding warrants, and the like may be stored and/or databases where driver's license lookups, and the like, may be performed by police personnel and/or using devices associated with police services. Such other types of computing devices, which may be sources of data associated with the second vehicle 102, may include, but are not limited to, government databases and/or computing devices, other law enforcement databases and/or computing devices, justice department databases and/or computing devices, corrections department databases and/or computing devices, open-access databases and/or computing devices, crowd-sourced databases and/or computing devices, and the like.

Furthermore, one or more of the computing devices 161, 162, 163, 164, 165, 166 may be combined and/or be configured to interact with each other and/or other computing devices and/or databases storing data associated with the second vehicle 102. For example, the records management system computing device 163, the vehicle record computing device 164 and the computer aided dispatch computing device 166 may further comprise public safety computing devices (e.g. operated by a public safety entity), and which may be interrelated with data stored in separate and/or common databases.

Furthermore, each of the one or more of the media access computing device 160, the geographic information computing device 161, the weather computing device 162 and the traffic computing device 165 may comprise a public safety computing device (e.g. operated by a public safety entity) and/or a commercial computing device (e.g. operated by a commercial entity).

While components of the computing devices 160, 161, 162, 163, 164, 165, 166 are not depicted, it is assumed that the computing devices 160, 161, 162, 163, 164, 165, 166 each comprise a respective controller, memory and communication interface, similar to the computing devices 111, 113. Similarly, one or more of the computing devices 160, 161, 162, 163, 164, 165, 166 with processing and/or memory resources shared between them.

In general, each of the computing devices 160, 161, 162, 163, 164, 165, 166 are in communication with the tactical driving computing device 113 and are configured to provide data associated with the second vehicle 102 to the tactical driving computing device 113.

For example, as depicted, the media access computing device 160 is configured to communicate with one or more multimedia sensors which may be used to monitor the road 104 including, but not limited to, at least one camera 173 (e.g. a closed-circuit television (CCTV) camera, a video camera, and the like) which monitors the road 104, as well as at least one optional microphone 175 and/or any other multimedia sensors which may be used to monitor the road 104. The optional microphone 175 may be components of the at least one camera 173 (e.g. as depicted) and/or may be separate from the at least one camera 173. Furthermore, the media access computing device 160 and at least one camera 173 (and/or the microphone 175) may be components of a public safety monitoring system and/or may be components of a commercial monitoring and/or private security system to which the tactical driving computing device 113 has been provided access. The camera 173 and/or the microphone 175 generate multimedia sensor data including one or more of video data, image data, audio data and the like, for example in a vicinity of the second vehicle 102. Such multimedia sensor data may include, but is not limited to, images and/or video of vehicles and/or bystanders on or near the road 104, and the like, sound of voices of bystanders on or near the road 104, and the like. Hence, the multimedia sensor data may be indicative of bystanders at the location of the second vehicle 102.

The geographic information computing device 161 is configured to provide location and/or geographic information systems (GIS) data, and the like, associated with a location. Such geographic information systems data may include, but is limited to, maps and/or terrain and/or population density and/or community/property infrastructure and/or community/property facilities (e.g. houses and/or businesses and/or streetlamps etc.) and/or images and/or satellite images and/or models (e.g. of buildings, landscape features, etc.) of a location, for example the vicinity of the second vehicle 102.

The weather computing device 162 is configured to provide weather data associated with a location (e.g. location data pertaining to weather), which may include, but is not limited to, road conditions (e.g. icy, wet, etc.) of the road 104, environmental hazards (e.g. storms, snow storms, heavy rain, etc.), and the like, for example in the vicinity of the second vehicle 102.

The records management system computing device 163 is configured to provide police records, and the like, for example of a person driving the second vehicle 102 including, but not limited to, criminal data associated with the person driving the second vehicle 102. Such criminal data may indicate whether the person driving the second vehicle is known to be violent and/or known to carry a weapon, such as a gun, and the like. However, such criminal data, and the like, may be stored in another type of computing device and/or data base, such as a government database, other law enforcement agency databases, and the like, accessible to the tactical driving computing device 113 and/or the CAD computing device 166.

The vehicle record computing device 164 is configured to provide vehicle records, for example of the second vehicle 102 and/or driving records, for example of a driver of the second vehicle 102. Such vehicle and/or driver data may include a history of the second vehicle 102, a type of the second vehicle 102, a state of repair of the second vehicle 102, years of driving experience of the driver of the second vehicle 102, and the like. Alternatively, such data may be stored in a police records database accessible to the tactical driving computing device 113 and/or the vehicle record computing device 164 may include a police records database, and the like. However, the vehicle record computing device 164 may alternatively comprises a department of motor vehicles computing device, and the like.

The traffic computing device 165 is configured to provide traffic data indicative of traffic for a location including, but not limited to, traffic density, traffic jams, traffic congestion, and the like, for example the vicinity of the second vehicle 102. While not depicted, the traffic computing device 165 may be configured to receive traffic sensor data from sensors 176 embedded in the road 104 to determine traffic density, traffic jams, traffic congestion, and the like on the road 104.

The computer aided dispatch (CAD) computing device 166 is configured to provide dispatch data including, but not limited to, an incident report, incident information, an incident note, an incident assignment, voice data (e.g. of a recording on an associated 911 call, and the like), video data, images, map coordinates, routing information, and the like. The voice, video, images, data and the like, at least a portion of which may have been transmitted to the vehicle computing device 111 in a dispatch command that resulted in the first vehicle 101 pursuing the second vehicle 102. Such a dispatch command may be transmitted to the vehicle computing device 111 and/or a vehicle computing device of the third vehicle 103 by a dispatch center and data associated with the dispatch commands (e.g. an incident note and/or an incident assignment and/or incident information) stored at the computer aided dispatch computing device 166. In some embodiments, such an incident assignment may include an incident identifier, and the like, assigned to the pursuit of the second vehicle 102. In yet further embodiments, such incident identifier may also be transmitted to the tactical driving computing device 113 with a dispatch command. Furthermore, in some embodiments, criminal data, and the like, may be retrieved via the CAD computing device 166 interacting with another type of computing device and/or data base, such as a government database, other law enforcement agency database, and the like, accessible to the CAD computing device 166.

The components of the system 100 are generally configured to communicate with each other via communication links 177, which may include wired and/or wireless links (e.g. cables, communication networks, the Internet, and the like) as desired.

While the computing devices 111, 113 are depicted as separate from one another, the tactical driving computing device 113 may be integrated with the vehicle computing device 111 and/or functionality of the tactical driving computing device 113 may be integrated with the vehicle computing device 111. In these embodiments, the link 177 between the computing devices 111, 113 is eliminated and/or not present.

However, computing resources and/or memory resources may be shared between the computing devices 111, 113 using the link 177.

In other words, the functionality of the system 100 may be distributed between one or more of the computing devices 111, 113.

As such, each of the computing devices 111, 113 and each of controllers 120, 140 may be associated with the first vehicle 101. In other words, the computing devices 111, 113 are configured to implement functionality for autonomous tactical vehicle control for the first vehicle 101.

At least a portion of the vehicle computing device 111 may comprise a mobile communication device (as depicted), including, but not limited to, any suitable combination of radio devices, electronic devices, communication devices, computing devices, portable electronic devices, mobile computing devices, portable computing devices, tablet computing devices, telephones, PDAs (personal digital assistants), cellphones, smartphones, e-readers, mobile camera devices and the like.

In some embodiments, the vehicle computing device 111 is specifically adapted for emergency service radio functionality, and the like, used by emergency responders, including, but not limited to, public safety responders, emergency responders, police responders (as depicted), fire responders, emergency medical responders, and the like. In some of these embodiments, the vehicle computing device 111 further includes other types of hardware for emergency service radio functionality, including, but not limited to, push-to-talk ("PTT") functionality. Indeed, the vehicle computing device 111 may be configured to wirelessly communicate over communication channels which may include, but are not limited to, one or more of wireless channels, cell-phone channels, cellular network channels, packet-based channels, analog network channels, Voice-Over-Internet ("VoIP"), push-to-talk channels and the like, and/or a combination. Indeed, the term "channel" and/or "communication channel", as used herein, includes, but is not limited to, a physical radio-frequency (RF) communication channel, a logical radio-frequency communication channel, a non-trunking talkgroup, a trunking talkgroup, a non-trunking announcement group, a trunking announcement group, a VOIP communication path, a push-to-talk channel, and the like.

The vehicle computing device 111 may further include additional or alternative components related to, for example, telephony, messaging, entertainment, and/or any other components that may be used with computing devices and/or communication devices.

Furthermore, in some embodiments, the tactical driving computing device 113 may be implemented as one or more servers and/or in a cloud computing environment, with functionality of the tactical driving computing device 113 being distributed between one or more servers and/or distributed in the cloud computing environment.

Each of the controllers 120, 140 includes one or more logic circuits configured to implement functionality for autonomous tactical vehicle control. Example logic circuits include one or more processors, one or more electronic processors, one or more microprocessors, one or more ASIC (application-specific integrated circuits) and one or more FPGA (field-programmable gate arrays). In some embodiments, one or more of the controllers 120, 140 and/or one or more of the computing devices 111, 113 are not generic controllers and/or a generic computing devices, but controllers and/or computing device specifically configured to implement functionality for autonomous tactical vehicle control. For example, in some embodiments, one or more of the controllers 120, 140 and/or one or more of the computing devices 111, 113 specifically comprises a computer executable engine configured to implement specific functionality for autonomous tactical vehicle control.

The memories 122, 142 each comprise a machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the embodiment of FIG. 1, programming instructions (e.g., machine readable instructions) that implement the functional teachings of the computing devices 111, 113 as described herein are maintained, persistently, at the memories 122, 142 and used by the respective controllers 120, 140 which makes appropriate utilization of volatile storage during the execution of such programming instructions.

For example, each of the memories 122, 142 store respective instructions corresponding to the applications 123, 143 that, when executed by the respective controllers 120, 140 implement the functionality of the system 100. In some embodiments, one or more of the applications 123, 143 may be components of, and/or are configured to interface with, a virtual partner and/or virtual assistant application.

For example, when one or more of the controllers 120, 140 implement a respective application 123, 143, one or more of the controller 120, 140 are configured to: receive data associated with the second vehicle 102 pursued by the first vehicle 101; determine, using the data associated with the second vehicle 102, a plurality of tactical intercept maneuvers and respective risk factors associated with the plurality of tactical intercept maneuvers; select a tactical intercept maneuver, from the plurality of tactical intercept maneuvers, based on the respective risk factors; and, one or more of: cause, the first vehicle 101 to autonomously perform the tactical intercept maneuver; and, cause a notification device at the first vehicle 101 to provide guidance for an operator of the first vehicle 101 to perform the tactical intercept maneuver using the first vehicle 101.

The interfaces 124, 144 are generally configured to communicate using respective links 177 which are wired and/or wireless as desired. The interface 124, 144 may implemented by, for example, one or more cables, one or more radios and/or connectors and/or network adaptors, configured to communicate wired and/or wirelessly, with network architecture that is used to implement the respective communication links 177.

The interfaces 124, 144 may include, but are not limited to, one or more broadband and/or narrowband transceivers, such as a Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver operating in accordance with an IEEE 802.16 standard, and/or other similar type of wireless transceiver configurable to communicate via a wireless network for infrastructure communications.

In yet further embodiments, the interfaces 124, 144 may include one or more local area network or personal area network transceivers operating in accordance with an IEEE 802.11 standard (e.g., 802.11a, 802.11b, 802.11g), or a Bluetooth™ transceiver which may be used to communicate to implement the respective communication links 177.

However, in other embodiments, the interfaces 124, 144 communicate over the links 177 using other servers and/or communication devices and/or network infrastructure devices, for example by communicating with the other servers and/or communication devices and/or network infrastructure devices using, for example, packet-based and/or internet protocol communications, and the like. In other words, the links 177 may include other servers and/or communication devices and/or network infrastructure devices, other than the depicted components of the system 100.

In any event, it should be understood that a wide variety of configurations for the computing devices 111, 113 are within the scope of present embodiments.

Figure 2:
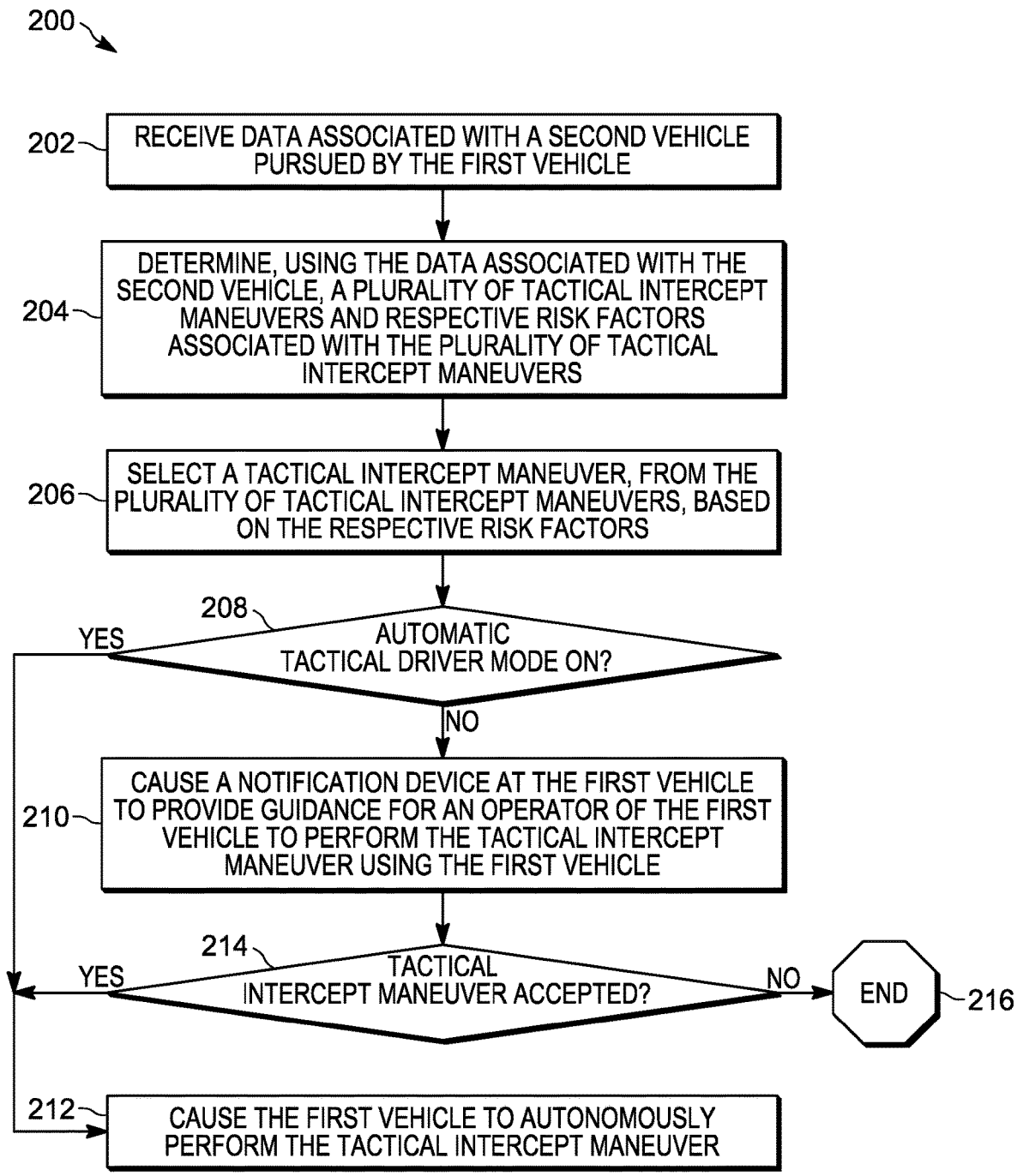
FIG. 2 is a flowchart of a method for autonomous tactical vehicle control in accordance with some embodiments.

Attention is now directed to FIG. 2 which depicts a flowchart representative of a method 200 for autonomous tactical vehicle control. The operations of the method 200 of FIG. 2 correspond to machine readable instructions that are executed by, for example, one or more of the computing devices 111, 113, and specifically by one or more of the controllers 120, 140 of the computing devices 111, 113. In the illustrated example, the instructions represented by the blocks of FIG. 2 are stored at one or more of the memories 122, 142, for example, as the applications 123, 143. The method 200 of FIG. 2 is one way in which the controllers 120, 140 and/or the computing devices 111, 113 and/or the system 100 is configured. Furthermore, the following discussion of the method 200 of FIG. 2 will lead to a further understanding of the system 100, and its various components. However, it is to be understood that the method 200 and/or the system 100 may be varied, and need not work exactly as discussed herein in conjunction with each other, and that such variations are within the scope of present embodiments.

The method 200 of FIG. 2 need not be performed in the exact sequence as shown and likewise various blocks may be performed in parallel rather than in sequence. Accordingly, the elements of method 200 are referred to herein as "blocks" rather than "steps." The method 200 of FIG. 2 may be implemented on variations of the system 100 of FIG. 1, as well.

At a block 202, one or more of the controllers 120, 140 receive data associated with the second vehicle 102 pursued by the first vehicle 101.

At a block 204, one or more of the controllers 120, 140 determine, using the data associated with the second vehicle

102, a plurality of tactical intercept maneuvers and respective risk factors associated with the plurality of tactical intercept maneuvers.

At a block 206, one or more of the controllers 120, 140 select a tactical intercept maneuver, from the plurality of tactical intercept maneuvers, based on the respective risk factors.

At an optional block 208, one or more of the controllers 120, 140 determines whether an automatic tactical driver mode is on, for example at the first vehicle 101. When the automatic tactical driver mode is off (e.g. a "NO" decision at the block 208), at a block 210, one or more of the controllers 120, 140 causes a notification device at the first vehicle 101 (e.g. the display device 126 and/or the speaker 128) to provide guidance for an operator of the first vehicle 101 to perform the tactical intercept maneuver using the first vehicle 101. The operator of the first vehicle 101 (e.g. the responder 105) may manually implement the tactical intercept maneuver using the guidance.

Otherwise, when the automatic tactical driver mode is on (e.g. a "YES" decision at the block 208), at a block 212, one or more of the controllers 120, 140 cause the first vehicle 101 to autonomously perform the tactical intercept maneuver.

Returning to the block 210, in some embodiments, when the notification device at the first vehicle 101 provides guidance for an operator of the first vehicle 101 to perform the tactical intercept maneuver using the first vehicle 101, the guidance may optionally be provided with selectable options for accepting or rejecting the tactical intercept maneuver; hence, at a block 214, one or more of the controllers 120, 140 determines whether the tactical intercept maneuver is accepted.

When the tactical intercept maneuver is not accepted (e.g. a "NO" decision at the block 214), for example a selectable option for rejecting the tactical intercept maneuver has been selected, at a block 216, the method 200 ends. However, the notification device at the first vehicle 101 may continue to provide the guidance such that the operator of the first vehicle 101 may manually implement the tactical intercept maneuver using the guidance.

When the tactical intercept maneuver is accepted (e.g. a "YES" decision at the block 214), for example a selectable option for accepting the tactical intercept maneuver has been selected, the block 212 is implemented as described above.

Example embodiments of the method 200 will now be described with reference to FIG. 3 to FIG. 10, with FIG. 3, FIG. 5 and FIG. 10 being substantially similar to FIG. 1 with like elements having like numbers. Furthermore, while in the following example embodiments the tactical driving computing device 113 and the vehicle computing device 111 are described as implementing specific blocks of the method 200, either alone or in combination, the method 200 may be implemented wholly in either of the tactical driving computing device 113 or the vehicle computing device 111.

It is further assumed in the following example embodiments that the controller 120 of the vehicle computing device 111 is implementing the application 123, and the controller 140 of the tactical driving computing device 113 is implementing the application 143.

Figure 3:
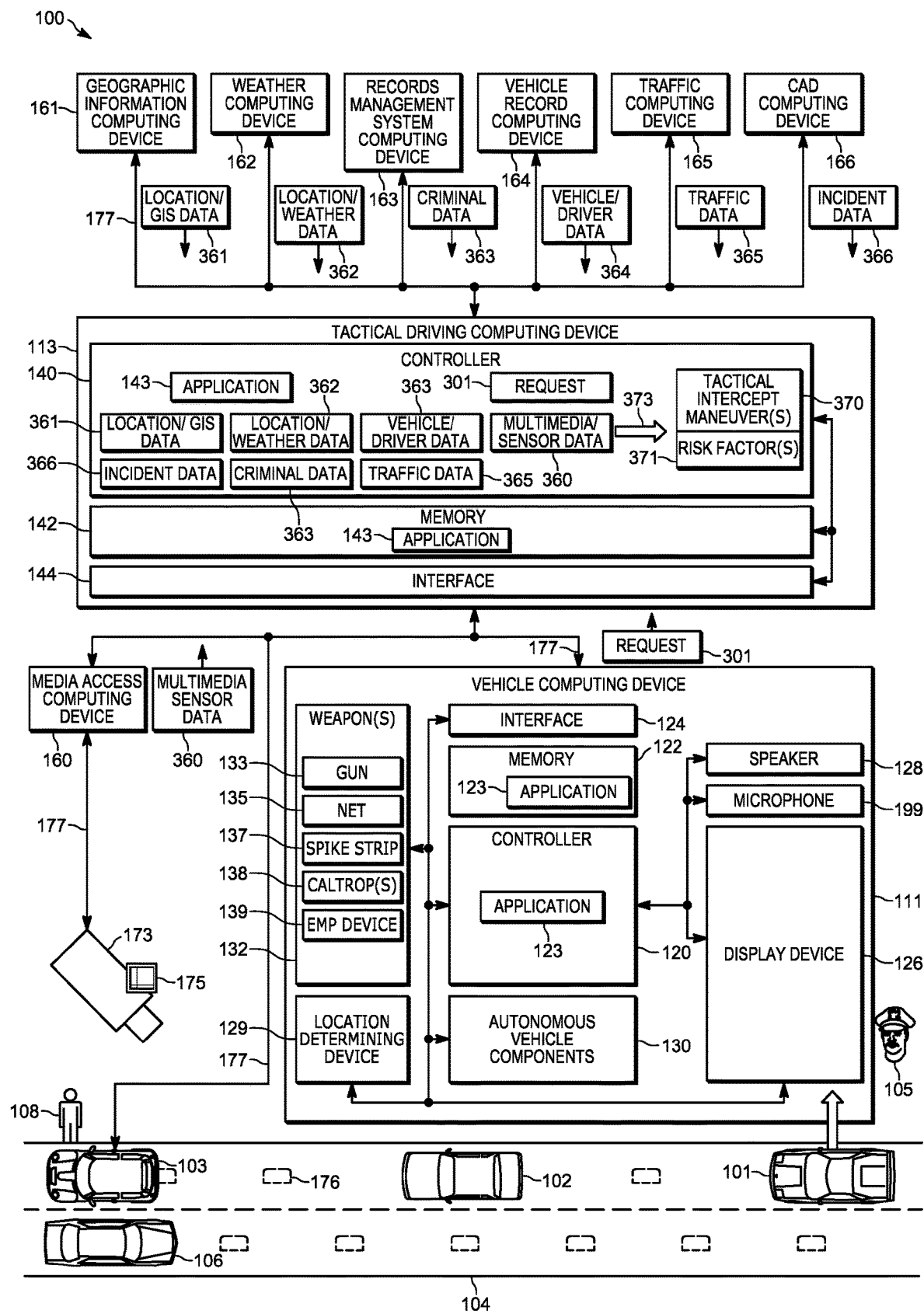
FIG. 3 depicts a tactical driving computing device of the system of FIG. 1 determining tactical intercept maneuvers and risk factors in accordance with some embodiments.

Attention is next directed to FIG. 3 which depicts example embodiments of blocks 202, 204 of the method 200.

In the example of FIG. 3, the vehicle computing device 111 is transmitting a request 301 for one or more tactical intercept maneuvers to the tactical driving computing device 113. The request 301 may include one or more of: a location and/or direction of travel of the first vehicle 101 (e.g. as determined using the location determining device 129), an incident identifier (e.g. which may have been received in an incident assignment, a dispatch command, and the like, from the computer aided dispatch computing device 166 which caused the first vehicle 101 to pursue the second vehicle 102), a license plate number of the second vehicle 102 (e.g. as input at an input device of the first vehicle 101 by the responder 105 and/or as captured using a camera at the first vehicle 101), and the like.

Furthermore, the request 301 may be transmitted automatically by the vehicle computing device 111, for example when an incident assignment is received, which causes the first vehicle 101 to pursue the second vehicle 102, and/or the request 301 may be transmitted upon receipt of input from an input device at the first vehicle 101, for example when the responder 105 requests tactical intercept driving assistance using an interface (e.g. a graphic user interface), and the like, at the display device 126, and/or using verbal command received at a microphone of the first vehicle 101.

In response to receiving the request 301, the tactical driving computing device 113 may request data associated with the second vehicle 102 from one or more of the computing devices 160, 161, 162, 163, 164, 165, 166.

Alternatively, and/or in addition to, the tactical driving computing device 113 may request such data associated with the second vehicle 102 when the incident assignment is received at the tactical driving computing device 113. Indeed, in embodiments where the incident assignment is received at both the computing devices 111, 113, the request 301 may not be transmitted.

Alternatively, and/or in addition to, the computing devices 160, 161, 162, 163, 164, 165, 166 may periodically transmit such data associated with the second vehicle 102 (e.g. and other vehicles) to the tactical driving computing device 113. For example, the computing devices 160, 161, 162, 163, 164, 165, 166 may periodically transmit data associated vehicles in a given location to the tactical driving computing device 113.

As depicted, the tactical driving computing device 113 has received (e.g. at the block 202 of the method 200) data associated with the second vehicle 102, either directly associated, and/or associated by virtue of a location of the second vehicle 102 (e.g. assuming that the vehicles 101, 102 are generally co-located). Specifically, the tactical driving computing device 113 has received, respectively, from the computing devices 160, 161, 162, 163, 164, 165, 166: multimedia sensor data 360 (e.g. images, audio, and the like) from the camera 173 and/or the microphone 175; location and/or geographic information systems data 361; location and/or weather data 362; criminal data 363 associated with a driver of the second vehicle 102 (who may be identified via a license plate number of the second vehicle 102 and/or via facial matching software of images received from the camera 173); vehicle data of the second vehicle 102 and/or driver data 364 of the second vehicle 102 (both of which may be identified via a license plate number); traffic data 365 indicative of traffic in the location of the second vehicle 102 (which may include sensor data from the sensors 176); and computer aid dispatch data, which may include (as depicted) incident data 366 which provides further data about the second vehicle 102 and/or the driver of the second vehicle 102 including, but not limited to, whether the driver of the second vehicle 102 was reported to have a weapon, such as a gun.

Put another way, the data associated with the second vehicle 102, that is received at the tactical driving computing device 113, may include context data associated with the second vehicle 102. Such context data may include any of the received data that enables the tactical driving computing device 113 to determine a context of the second vehicle 102 and/or a context of the pursuit of the second vehicle 102, including, but not limited to: incident data associated with a pursuit of the second vehicle 102; driver data associated with a driver of the second vehicle 102; criminal data associated with the driver of the second vehicle 102; a type of the second vehicle 102; location data associated with a location of the second vehicle 102; and weather data indicative of current weather in a location of the second vehicle 102. Such data associated with the second vehicle 102 may be received from one or more of: one or more computing devices external to the first vehicle 101; a computer-aided dispatch computing device; a geographic information system computing device; and one or more sensors external to the first vehicle 101.

In other words, as will be described below, and in contrast to self-driving vehicles that navigate to avoid other vehicles using on-board sensors, the data associated with the second vehicle 102, that is received at the tactical driving computing device 113, includes context data received from one or more computing devices external to the first vehicle 101.

Furthermore, the data received at the tactical driving computing device 113 may enable the tactical driving computing device 113 to determine various parameters for determining a plurality of tactical intercept maneuvers for the first vehicle 101, and respective risk factors, including, but not limited to: weather in the vicinity (e.g. a location) of the second vehicle 102; a speed and/or direction of movement of the second vehicle 102 (e.g. from the speed and/or direction of movement of the first vehicle 101, video images from the camera 173, traffic data from the sensors 176 etc.); infrastructure and/or density of population in the vicinity (e.g. a location) of the second vehicle 102; road conditions in the vicinity (e.g. a location) of the second vehicle 102.

However, the data received at the tactical driving computing device 113 may enable the tactical driving computing device 113 to determine various other parameters for determining a plurality of tactical intercept maneuvers for the first vehicle 101, and respective risk factors, including, but not limited to: outstanding warrants and/or historic criminal behavior on the driver of the second vehicle 102 (e.g. using the criminal data 363); whether reasonable suspicion exists for apprehending the driver of the second vehicle 102 for an incident (e.g. using the criminal data 363 and/or the incident data 366); a type of the second vehicle 102 (e.g. from the vehicle and/or driver data 364); environmental hazards that may exist in the vicinity (e.g. a location) of the second vehicle 102 (e.g. from one or more of video images from the camera 173, the GIS data 361, the weather data 362 the incident data 366); whether there are pedestrians in the vicinity (e.g. a location) of the second vehicle 102 (e.g. from one or more of video images from the camera 173 and audio data from the microphone 175); and community and/or property infrastructure in the vicinity (e.g. a location) of the second vehicle 102 (e.g. from the GIS data 361).

However, such a list of parameters, and the like, that may be determined by the tactical driving computing device 113 from the received data associated with the second vehicle 102 is not meant to be exhaustive; indeed, the tactical driving computing device 113 may be configured and/or trained to determine other parameters used in determining a plurality of tactical intercept maneuvers for the first vehicle 101, and respective risk factors, for example based on feedback from the first vehicle 101 implementing tactical intercept maneuvers as described below.

In any event, as also depicted in FIG. 3, the controller 140 determines (e.g. at the block 204 of the method 200), using the data (e.g. one or more of data 360, 361, 362, 363, 363, 365, 366) associated with the second vehicle 102, a plurality of tactical intercept maneuvers 370 and respective risk factors 371 associated with the plurality of tactical intercept maneuvers 370. For example, the plurality of tactical intercept maneuvers 370 and respective risk factors 371 may be determined using one or more algorithms 373 (e.g. represented by an arrow in FIG. 3, the one or more algorithms 373 being component(s) of the application 143) which may include, but are not limited to, one or more of a generalized linear regression algorithm; a random forest algorithm; a support vector machine algorithm; a gradient boosting regression algorithm; a decision tree algorithm; a generalized additive model, and the like, as described above.

Indeed, the application 143 may include preconfigured tactical intercept maneuvers that may be performed by the first vehicle 101. The controller 140 may determine the plurality of tactical intercept maneuvers 370 by selecting and/or modifying the preconfigured tactical intercept maneuvers based on one or more of: the data 360, 361, 362, 363, 363, 365, 366, and locations for implementing the preconfigured tactical intercept maneuvers. The controller 140 may further determine the respective risk factors 371 for modified preconfigured tactical intercept maneuvers, based on one or more of data 360, 361, 362, 363, 363, 365, 366 and the locations.

Figure 4:
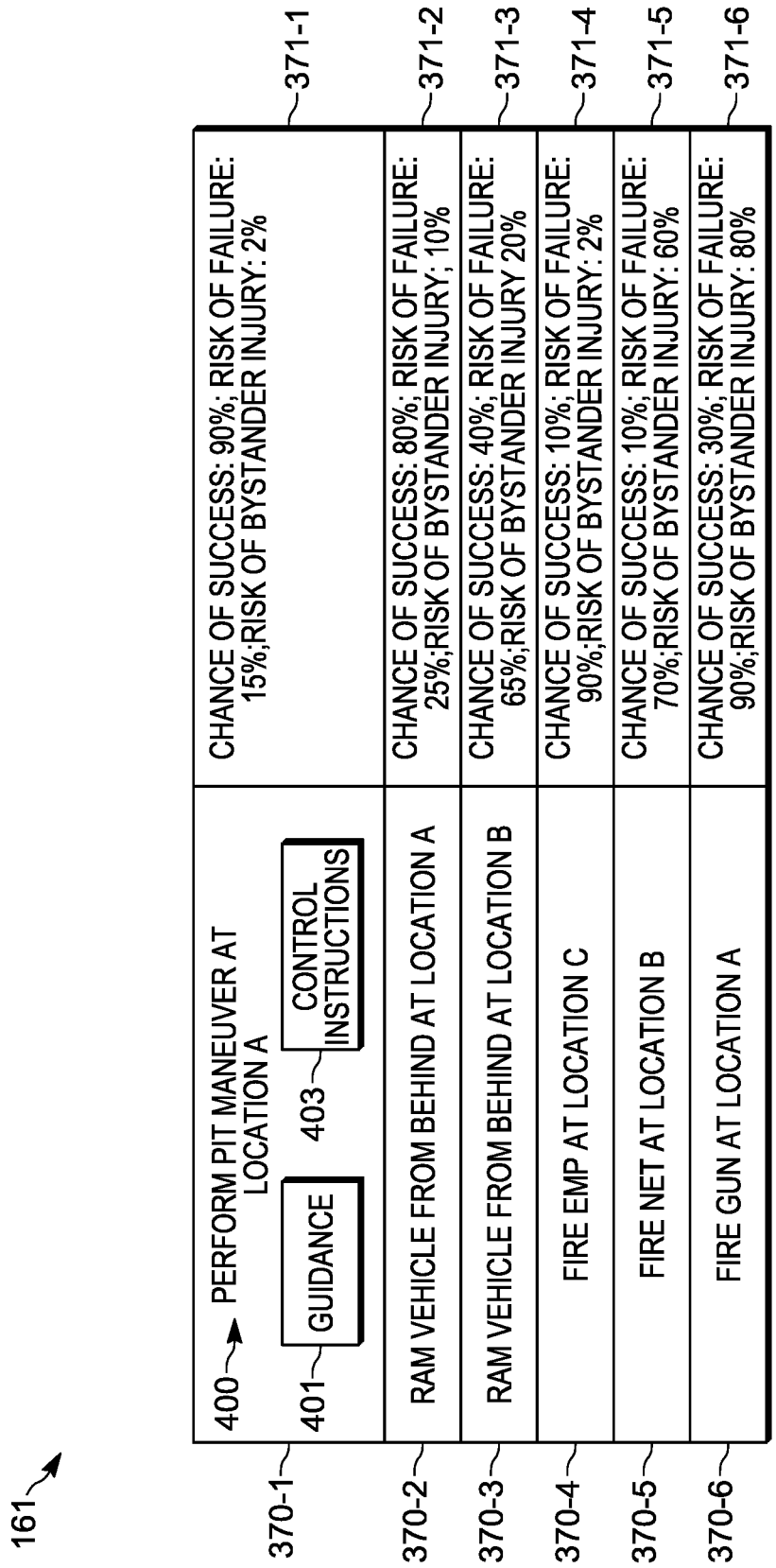
FIG. 4 depicts example tactical intercept maneuvers and risk factors in accordance with some embodiments.

For example, attention is next directed to FIG. 4 which depicts a list of example tactical intercept maneuvers 370-1, 370-2, 370-3, 370-4, 370-5, 370-6 and associated risk factors 371-1, 371-2, 371-3, 371-4, 371-5, 371-6.

For example, one or more of data 360, 361, 362, 363, 363, 365, 366 is used to determine a plurality of tactical intercept maneuvers, each of which may involve some interaction of the first vehicle 101 with the second vehicle 102 including, but not limited to controlling the first vehicle 101 to one or more of: physically intercept the second vehicle 102; ram the second vehicle 102; stop in front of the second vehicle 102; perform a pursuit intervention technique (PIT) maneuver, and the like. Such tactical intercept maneuvers are in contrast to general self-driving vehicle functionality which generally involve avoiding other vehicles.

Alternatively, a tactical intercept maneuver may comprise controlling the first vehicle to fire, towards, the second vehicle 102, one or more of: a weapon 132, the gun 133, the net 135, the spike strip 137, the caltrops 138, and an electromagnetic pulse from the electromagnetic pulse device 139.

In the example tactical intercept maneuvers 370 of FIG. 4, each tactical intercept maneuver 370 includes: an optional description of the respective tactical intercept maneuver; guidance and/or instructions that may be provided to a driver and/or operator of the first vehicle 101, at one or more notification devices, for manually performing the respective tactical intercept maneuver; and control instructions that may be implemented at the autonomous vehicle components 130 to autonomously implement the respective tactical intercept maneuver. Furthermore, the optional description may be a subset of the guidance.

As depicted, the optional description further includes a location of where to begin implementing the respective tactical intercept maneuver; such a location, however, is further provided in both the guidance and the control instructions.

Hence, as depicted, the controller 140 may be further configured to determine a location to implement a tactical intercept maneuver 370.

For example, attention is directed to the tactical intercept maneuver 370-1 which comprises performing a pursuit intervention technique maneuver at a location "A"; the location "A" is assumed to be a location on the road 104 which may be defined in coordinates similar to those produced by the location determining device 129, such as GPS coordinates, and the like. The tactical intercept maneuver 370-1 includes a textual description 400 of the respective tactical intercept maneuver.

The tactical intercept maneuver 370-1 further comprises guidance 401 for performing the tactical intercept maneuver 370-1, which may include textual and/or visual and/or audio instructions, and the like, for performing the tactical intercept maneuver 370-1; while details of the guidance 401 are not depicted, the guidance 401 generally comprises instructions on how to operate the first vehicle 101 to perform the tactical intercept maneuver 370-1, which may be provided by a notification device at the first vehicle 101.

Furthermore, such instructions may be provided sequentially at a notification device of the first vehicle 101, for example as the first vehicle 101 approaches a location for implementing the instructions, such that an operator of the first vehicle 101 may implement the instructions in a step-by-step sequential manner. For example, a first step in the PIT maneuver may be provided at a notification device of the first vehicle 101 prior to the first vehicle 101 arriving at the location "A"; when the first vehicle 101 reaches the location "A", the notification device at the first vehicle 101 may provide an indication of such, such that the first step may be implemented by the operator of the first vehicle 101. Similarly, second step in the PIT maneuver may be provided at a notification device of the first vehicle 101 prior to the first vehicle 101 arriving at a location "B" where the second step is to be implemented.

As depicted, the tactical intercept maneuver 370-1 further comprises control instructions 403 that may be implemented at the autonomous vehicle components 130 of the first vehicle 101 to autonomously implement the tactical intercept maneuver 370-1. Such control instructions 403 generally provide instructions for controlling one or more of the steering controllers, engine controllers, braking controllers, and the like, and which may be further based on input from of or more of the sensors and navigation devices of the autonomous vehicle components 130 (e.g. to determine the location of the first vehicle 101 and/or a position of the second vehicle 102 relative to the first vehicle 101).

While guidance and control instructions are not depicted for the other example tactical intercept maneuver 370 of FIG. 4, they are assumed to be present.

Each example risk factor 371 associated with the example tactical intercept maneuvers 370 of FIG. 4 comprise one or more of a score, a probability (and/or likelihood) of success or failure, a risk (and/or likelihood) of bystander injury, and the like. Other risk factors are within the scope of present embodiments, for example a risk of damaging property, a risk of responder injury, a risk of bystander vehicle damage, and the like.

The controller 140 may determine the risk factors 371, using the one or more algorithms 373, to determine the probability of a respective tactical intercept maneuver 370 succeeding or failing, and the risk of injury, and the like. Further, each risk factor 371 may include one or more respective risk factors.

For example, as depicted, three risk factors 371-1 for the tactical intercept maneuver 370-1 have been determined. Specifically, the chance of success of the PIT maneuver, when implemented at the location "A", has been determined to be 90%, and the chance/risk of failure has been determined to be 15%. The chance of success and the risk of failure need not add to 100% as they may be determined in different respective manners and/or using different respective algorithms and/or may use different criteria for determining success or failure. For example, a criterion for success may include successfully stopping the second vehicle 102 (regardless of damaging the first vehicle 101), while the criteria for failure may include both unsuccessfully stopping the second vehicle and damaging the first vehicle 101.

Furthermore, the chance and/or risk of success and/or failure need not be provided as a percentage; for example, the chance and/or risk of success and/or failure may be provided as a confidence interval and/or any other representation of uncertainty. For example, such a confidence interval may include, but is not limited to, one or more of: as a mean value (e.g. mean chance of success) surrounded by a confidence interval (symmetrical or asymmetrical); as a mean value with a standard deviation; a probability distribution function; and/or any other suitable of statistical confidence interval, and the like.

Such success and/or failure risk factors may be determined from one or more of the geographic information systems data 361 (e.g. to determine terrain, locations of homes, business, infrastructure, and the like), the weather data (e.g. to determine a condition of the road 104 and/or visibility and/or environmental hazards), the criminal data 363 and/or the incident data 366 (e.g. to determine how dangerous a driver of the second vehicle 102 may be and/or whether the driver is known to carry a gun), the multimedia sensor data 360 (e.g. to determine if the driver is carrying a gun), the driver data 364 (e.g. to determine whether the driver of the second vehicle 102 is a skilled driver based on years of driving experience and/or a driving record), and the like.

As depicted, the risk factors 371-1 further include a risk of injuring a bystander, such as the bystander 108 and/or a person in the bystander vehicle 106. Such risk of injuring a bystander may be determined from locations of bystanders and/or traffic as determined using one or more of the multimedia sensor data 360, the traffic data 365, and the like. Such a risk of injuring a bystander may include a determination of whether the bystander vehicle 106 might be able to stop and/or avoid the vehicles 101, 102 when the first vehicle 101 is implementing the associated tactical intercept maneuver 370-1.

Furthermore, the risk factors 371 may be location dependent. For example, the tactical intercept maneuvers 370-2, 370-3 are similar to each other, but are implemented at different locations. For example, each tactical intercept maneuvers 370-2, 370-3 include the first vehicle 101 ramming the second vehicle 102 from behind at, respectively, a location "A" and a location "B". However, the risk factors 371-2 for ramming the second vehicle 102 from behind at the location "A" indicate a better chance of success, lower risk of failure and a lower risk of bystander injury than the risk factors 371-3 for ramming the second vehicle 102 from behind at the location "B".

As depicted, other tactical intercept maneuvers 370 may include firing different weapons at different locations. However, other types of tactical intercept maneuvers are within the scope of the present specification, including, but not limited to, physically intercepting the second vehicle 102 to cause the second vehicle 102 to drive into a light post, and the like.

As depicted, the tactical intercept maneuvers 370 have further been ranked with respect to the risk factors 371, by way of their position in the list of tactical intercept maneuvers 370, with the first tactical intercept maneuver 370-1 in the list being the highest ranked and the last tactical intercept maneuver 370-6 being the lowest ranked. In other words, the tactical intercept maneuver 370-1 has been determined to be a recommended tactical intercept maneuver 370 as the combination of the risk factors 371-1 generally indicate that the tactical intercept maneuver 370-1 has a higher chance of success and/or a lower risk of failure and/or a lower risk of bystander injury than the other the tactical intercept maneuvers 370.

Such rankings may be determined in any suitable manner. For example, the different types of risk factors 371 may be weighted in any suitable manner: e.g. the risk of bystander injury may be given a higher weight than the chance of success and/or the risk of failure. Hence, for example, the tactical intercept maneuver 370-4 is higher ranked than similar tactical intercept maneuvers 370-5, 370-6, as the tactical intercept maneuver 370-4 has a lower bystander injury risk than the tactical intercept maneuvers 370-5, 370-6.

Indeed, the controller 140 may select (e.g. at the block 206 of the method 200) the tactical intercept maneuver 370-1 for implementation and/or execution at the first vehicle, from the plurality of tactical intercept maneuvers 370-1, based on the respective risk factors 371, by selecting the highest ranked tactical intercept maneuver 370.

Further examples of other tactical intercept maneuvers, and associated risk factors include: firing of the net 135 may be determined to have an 86% likelihood of arresting the driver of the second vehicle 102; the PIT maneuver may be determined to have an 52% likelihood of causing the second vehicle 102 to spin out into neighborhood (e.g. residential) yard, causing residential damage; and firing the spike strip 137 may be determined to have a 13% likelihood of causing gasoline leak and/or car explosion and/or casualty at the second vehicle 102.

A further example of a tactical intercept maneuver and associated risk factors may include: ramming the second vehicle 102 into a light pole, and the like, when the driver of the second vehicle 102 has less than a given number of years of driving experience (e.g. 5 years) and/or has a poor driving record, and is further determined to be holding a handgun; while the risk of injuring an operator of the first vehicle 101 and/or bystanders may increase due to the handgun, the chance of success may increase due to the aggressive nature of the tactical intercept maneuver.

However, other tactical maneuvers that do not include an intercept maneuver may be determined, along with an associated risk factor; for example, continuing to pursue the second vehicle until out of a current residential area may be determined to have a 24% likelihood of a successful future tactical intercept maneuver, such as a road-block, and the like by the first vehicle 101 and/or the third vehicle 103. Another such tactical maneuver may include, but is not limited to: turning on an auto-tracking mode at the first vehicle 101 to automatically follow the second vehicle 102, based, for example on weather conditions (e.g. fog with visibility less than 20 meters).

Yet another such tactical maneuver may include, but is not limited to: increasing an auto-tracking distance to a given distance (e.g. as set by a public safety organization). For example, the driver of the second vehicle 102 may have at least a given number of years of driving experience (e.g. 20 years), which may lead to a given increase in the auto-tracking distance.

Furthermore, increases or decreases to risk factors for tactical intercept maneuvers, may depend on whether the driver of the second vehicle 102 is determined to have a gun and/or is suspected of having a gun. For example, a probability of the driver having a gun may have been determined, and such a probability may be above a threshold probability (e.g. 80%). Such a probability of the driver having a gun being above the threshold probability may decrease a chance of a successful arrest (of a tactical maneuver and/or a tactical intercept maneuver), and the like, by a given value, such as 20%.

Indeed, such rules may be used by the one or more algorithms 373 to determine and/or adjust the associated risk factors 371.

In some embodiments, such tactical maneuvers may be included and ranked with the tactical intercept maneuvers 370 and selected over a tactical intercept maneuver 370 when associated risk factors indicate a better chance of success and/or a better chance of not injuring a bystander.

Figure 5:
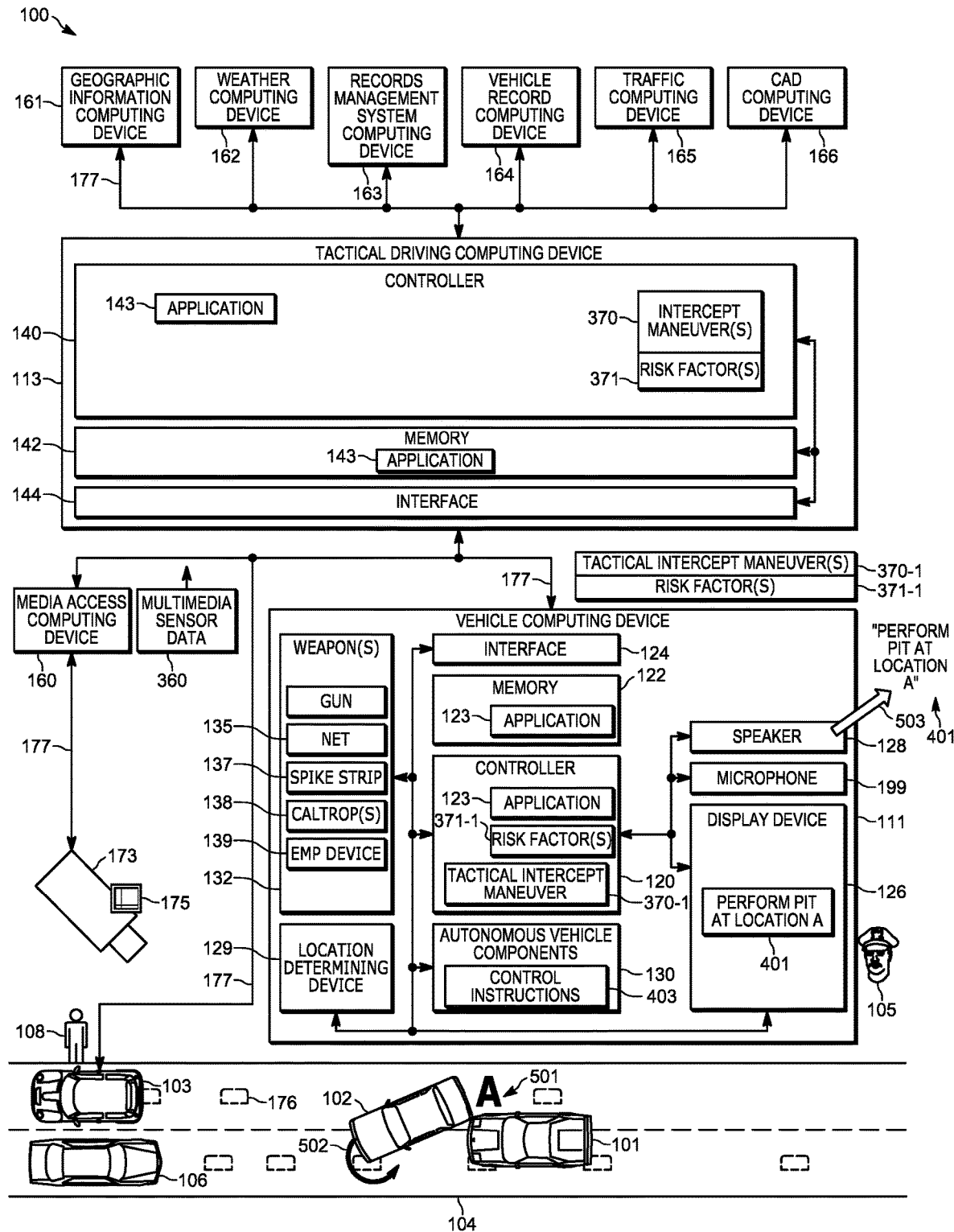
FIG. 5 depicts a tactical intercept maneuver being autonomously implemented at a vehicle in the system of FIG. 1 in accordance with some embodiments.

Attention is next directed to FIG. 5, which depicts example embodiments of the blocks 210, 212 of the method 200. As depicted, the controller 140 of the tactical driving computing device 113 transmits at least the selected tactical intercept maneuver 370-1 to the first vehicle 101 (e.g. including the guidance 401 and the control instructions 403) to cause the first vehicle 101 to one or more of: autonomously perform the tactical intercept maneuver 370-1; and cause a notification device at the first vehicle 101 to provide guidance for an operator of the first vehicle 101 to perform the tactical intercept maneuver 370-1 using the first vehicle 101. As depicted, the controller 140 of the tactical driving computing device 113 optionally transmits the risk factors 371-1

For example, as depicted, the guidance 401 may be caused to be provided (e.g. at the block 210 of the method 200) at the display device 126, for example as text and/or instructions to perform the tactical intercept maneuver at the location "A". While not depicted, the display device 126 may also provide the risk factors 371-1.

Alternatively, the guidance 401 may be caused to be provided (e.g. at the block 210 of the method 200) at the speaker 128 as sound 503 emitted by the speaker 128. While not depicted, the speaker 128 may also provide the risk factors 371-1. In these embodiments, the controller 120 receives the tactical intercept maneuver 370-1 and responsively controls a notification device at the first vehicle to provide the guidance 401 (and optionally provide the risk factors 371-1).

However, any notification device at the first vehicle 101 may be caused to provide the guidance 401; for example, in some embodiments, the first vehicle 101 may include lights, such as light emitting diodes (LEDs), and the like, adjacent to and/or integrated with and/or associated with vehicle controls, and providing the guidance 401 may include causing the lights for respective vehicle controls to emit light to indicate that the vehicle control is to be operated when the first vehicle 101 arrives at the location "A". Control of lights may include controlling the lights to indicate how a respective vehicle control is to be operated, for example a turn direction and/or speed direction for operating a steering wheel, and the like.

Further the controller 120 may provide, at a notification device at the first vehicle 101, the guidance 401 prior to the first vehicle 101 arriving at the location "A", so that the operator of the first vehicle 101 (e.g. the responder 105) has time to prepare to implement the tactical intercept maneuver 370-1 and/or as a warning that the tactical intercept maneuver 370-1 is to be intercepted.

As depicted, the first vehicle 101 is being caused to autonomously perform the tactical intercept maneuver 370-1, for example at the location "A". In particular, the controller 120 is executing the control instructions 403 at the autonomous vehicle components 130. Hence, as depicted, when the first vehicle 101 arrives at the location "A" indicated at location 501 in FIG. 5, and as determined, for example using the location determining device 129, the first vehicle 101 implements the PIT maneuver to physically intercept the second vehicle 102 at a rear driver's side corner of the second vehicle 102, which causes the second vehicle 102 to spin out and stop, as represented by the arrow 502.

Figure 6:
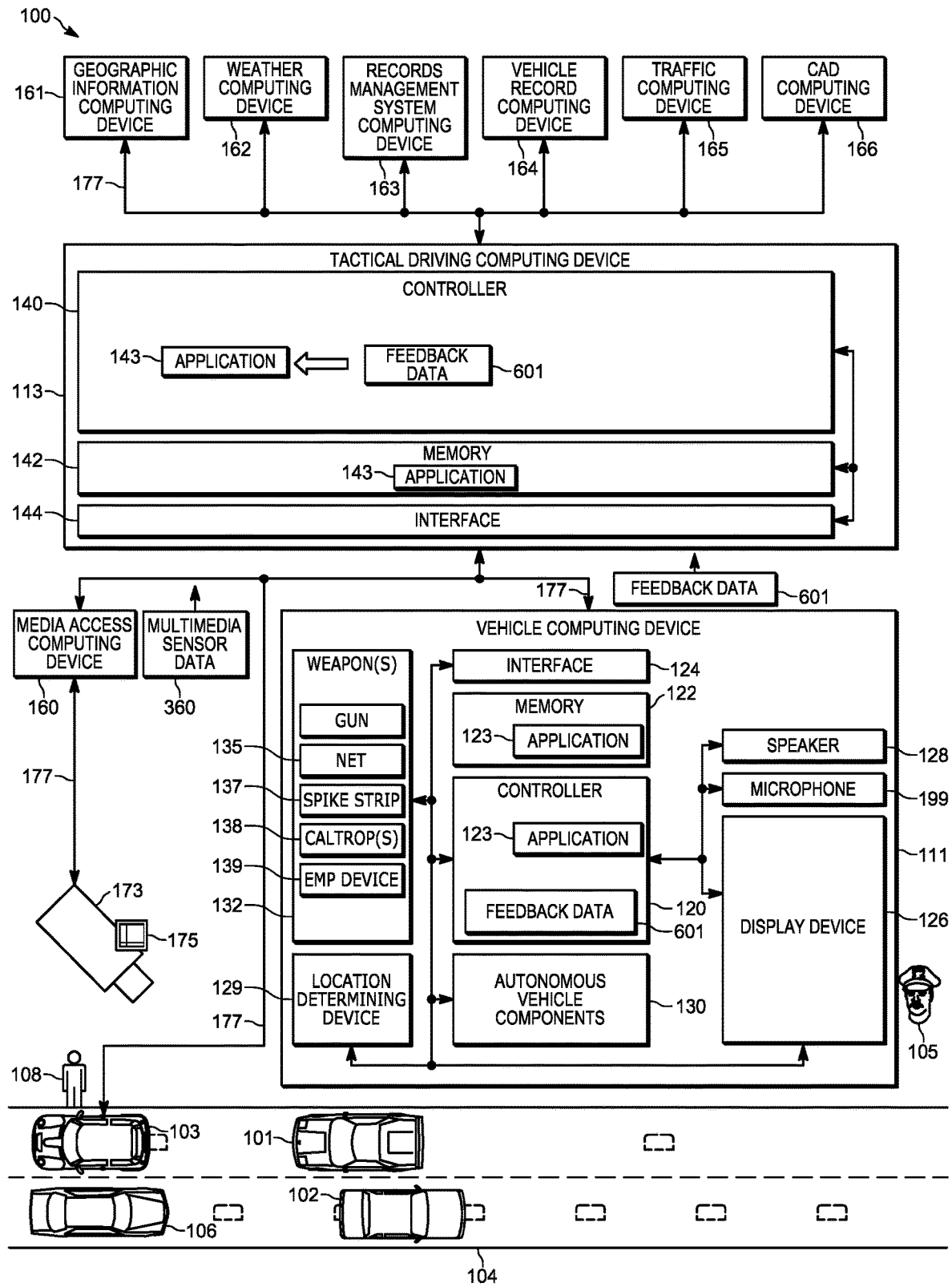
FIG. 6 depicts the vehicle providing feedback data on the implemented tactical intercept maneuver to the tactical driving computing device of the system of FIG. 1 in accordance with some embodiments.

Attention is next directed to FIG. 6 which depicts the system 100 after the tactical intercept maneuver 370-1 has been implemented. The second vehicle 102 has stopped due to the first vehicle 101 having implemented the tactical intercept maneuver 370-1 (it is assumed that the bystander vehicle 106 has also stopped). It is furthermore assumed that, while the first vehicle 101 was implementing the tactical intercept maneuver 370-1, the controller 120 was collecting sensor data, and the like from the autonomous vehicle components 130, which is collected as feedback data 601.

As depicted, the controller 120 transmits the feedback data 601 to the tactical driving computing device 113 such that the feedback data 601 may be used by the tactical driving computing device 113 to "train" the application 143 and/or the one or more algorithms 373 with respect to how the tactical intercept maneuver 370-1 was implemented; the feedback data 601 may also include indications of a success or failure of the tactical intercept maneuver 370-1 based, for example, on input received at the vehicle computing device 111 via the responder 105 interacting with an input device.

Hence, the feedback data 601 may be used in a future execution of the method 200 to determine, for example risk factors associated with PIT maneuvers, and the like, for example when the data associated with a second vehicle in a future pursuit is similar to the data associated with the second vehicle 102 used in determining the risk factors 371-1.

However, such training may occur at another computing device (for example, one or more cloud computing devices, not depicted) which also stores the applications 373; the feedback data 601 may alternatively be stored at and/or transmitted to the other computing device by the controller 120 and/or the controller 140.

Figure 7:
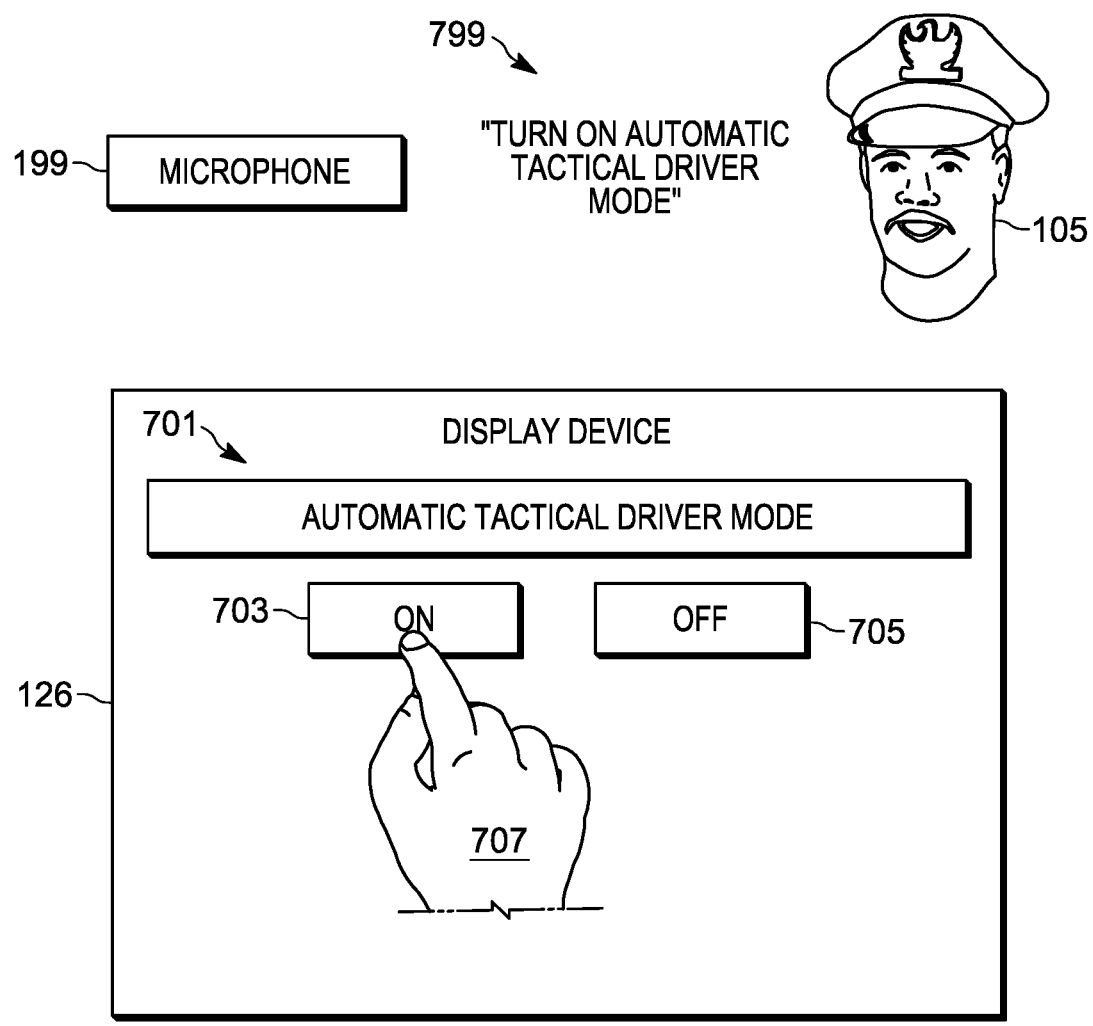
FIG. 7 depicts interfaces for turning an automatic tactical driver mode on and off in accordance with some embodiments.

Attention is next directed to FIG. 7, which depicts a portion of an example embodiment of the block 208 of the method 200. In particular, FIG. 7 depicts an example interface 701 that may be provided at the display device 126 at the first vehicle 101. It is assumed in FIG. 7 that the display device 126 includes a touch screen, and the like, as an input device. The interface 701 may be used to turn an automatic tactical driver mode of the first vehicle on or off. The interface 701 may be selected via a menu system, and the like, at the display device 126 and/or automatically provided when the first vehicle 101 is started. As depicted, the interface 701 includes selectable options 703, 705 for respectively turning the automatic tactical driver mode on or off. As depicted, the selectable options 703, 705 include virtual buttons, and the like, but the selectable options 703, 705 may be in any format suitable for turning the automatic tactical driver mode on or off. In some embodiments, the automatic tactical driver mode is automatically on when the first vehicle 101 is started while in other embodiments the automatic tactical driver mode is automatically off when the first vehicle 101 is started. Either way, the responder 105 may use a finger of their hand 707 to interact with the selectable options 703, 705 via the touch screen of the display device 126 to turn the automatic tactical driver mode on or off.

Hence, when the automatic tactical driver mode is on (automatically and/or as selected using the selectable option 703), at the block 208, a "YES" decision occurs and the block 212 is implemented. With brief reference to FIG. 5, the control instructions 403 are automatically used to autonomously control the first vehicle 101. However, the block 210 may be implemented at least as a warning to the operator of the first vehicle 101 that a tactical intercept maneuver is about to autonomously occur.

Returning to FIG. 7, when the automatic tactical driver mode is off (automatically and/or as selected using the selectable option 705), at the block 208, a "NO" decision occurs and the block 210 is implemented. Again, with brief reference to FIG. 5, the control instructions 403 are not automatically used to autonomously control the first vehicle 101; rather, the guidance 410 is provided at a notification device of the first vehicle.

Alternatively, the automatic tactical driver mode may be turned on or off using voice commands received at the microphone 199 of the first vehicle 101. For example, as also depicted in FIG. 7, the responder 105 may issue a voice interaction and/or a voice command 799 for turning on the automatic tactical driver mode which is received by controller 120 via the microphone 199.

In yet further embodiments, an indication of the automatic tactical driver mode being on or off may be transmitted from the vehicle computing device 111 to the tactical driving computing device 113. When the indication indicates that the automatic tactical driver mode is on, the tactical driving computing device 113 may not transmit the guidance with the selected tactical intercept maneuver; similarly, the indication indicates that the automatic tactical driver mode is off, the tactical driving computing device 113 may not transmit the control instructions with the selected tactical intercept maneuver. Hence, the block 208 may be performed at one or more of the computing devices 111, 113.

Figure 8:
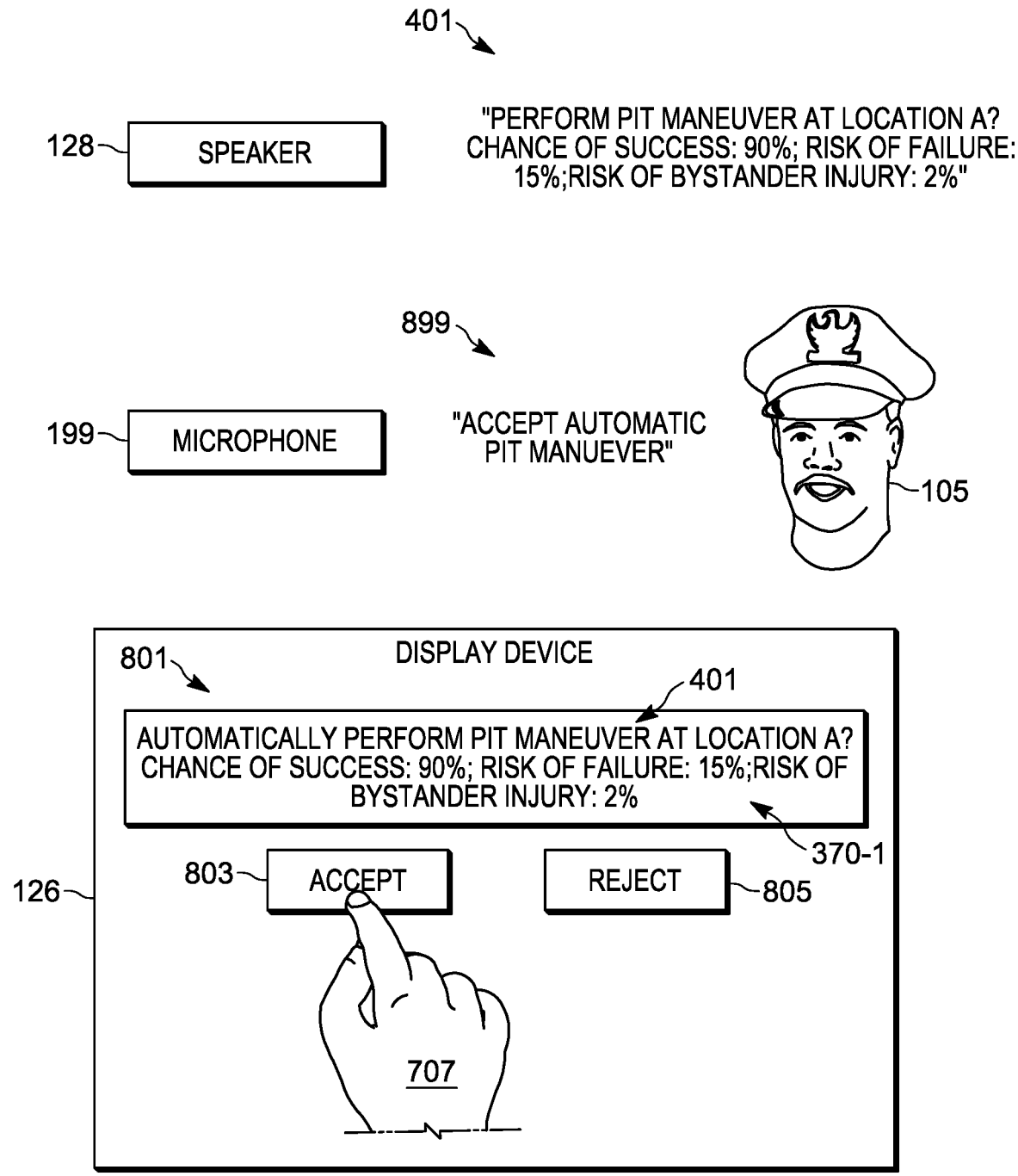
FIG. 8 depicts interfaces for accepting or rejecting a tactical intercept maneuver in accordance with some embodiments.

Attention is next directed to FIG. 8, which depicts an example embodiment of the blocks 210, 214 of the method 200. In particular, FIG. 8 depicts an example interface 801 that may be provided at the display device 126 at the first vehicle 101, for example at the block 210 of the method 200 to provide guidance to an operator of the first vehicle 101, such as the responder 105, to perform a tactical intercept maneuver. Again, it is assumed in FIG. 8 that the display device 126 includes a touch screen, and the like, as an input device. The interface 801 may be used to accept or reject a tactical intercept maneuver as selected at the block 214. The interface 801 may be selected via a menu system, and the like, at the display device 126 and/or automatically provided when a selected tactical intercept maneuver (such as the tactical intercept maneuver 370-1) is received from the tactical driving computing device 113.

As depicted, the interface 801 includes selectable options 803, 805 for respectively accepting or rejecting a tactical intercept maneuver. As depicted, the selectable options 803, 805 include virtual buttons, and the like, but the selectable options 803, 805 may be in any suitable format for accepting or rejecting a tactical intercept maneuver. The responder 105 may use the finger of their hand 707 to interact with the selectable options 803, 805 via the touch screen of the display device 126 to accept or reject a tactical intercept maneuver.

As depicted, it is assumed that the tactical intercept maneuver to be accepted or rejected is the tactical intercept maneuver 370-1. It is further assumed that the tactical intercept maneuver 370-1 has been transmitted with the risk factors 371-1. Hence, as depicted, the interface 801 includes an indication of the tactical intercept maneuver 370-1 such as the guidance 401 (though the guidance 401 may be modified, as depicted, to form a textual query as to whether the tactical intercept maneuver 370-1 is to be accepted or rejected), as well as a textual indication of the risk factors 371-1.

Hence, when the tactical intercept maneuver 370-1 is accepted (e.g. as selected using the selectable option 803), at the block 214, a "YES" decision occurs and the block 212 is implemented. With brief reference to FIG. 5, the control instructions 403 are automatically used to autonomously control the first vehicle 101.

Returning to FIG. 8, when the tactical intercept maneuver 370-1 is rejected (e.g. as selected using the selectable option 805), at the block 212, a "NO" decision occurs and the method 200 ends at the block 216. However, the guidance 401 may continue to be provided at the display device 126 (e.g. the method 200 may end other than providing the guidance at the block 210) to sequentially provide steps for implementing the tactical intercept maneuver 371-1.

Hence, the method 200 may further comprise: causing a notification device at the first vehicle 101 to provide guidance to perform a tactical intercept maneuver with selectable options (e.g. the selectable options 803, 805) for accepting or rejecting the tactical intercept maneuver; and, causing the first vehicle 101 to autonomously perform the tactical intercept maneuver only when a selectable option for accepting the tactical intercept maneuver (e.g. the selectable option 803) is accepted.

Alternatively, the tactical intercept maneuver 370-1 may be accepted or rejected using voice commands received at the microphone 199 of the first vehicle 101. For example, as also depicted in FIG. 8, the speaker 128 may be controlled by the controller 120 to "play" the guidance 401, and the responder 105 may issue a voice interaction and/or a voice command 899 for accepting (or rejecting) the tactical intercept maneuver 370-1 which is received by controller 130 via the microphone 199.

In yet further embodiments, an indication of a tactical intercept maneuver being accepted or rejected may be transmitted from the vehicle computing device 111 to the tactical driving computing device 113. In these embodiments, the tactical driving computing device 113 may transmit the guidance with a selected tactical intercept maneuver, but may not transmit the control instructions until receipt of an indication, that the selected tactical intercept maneuver is accepted. Hence, the block 214 may be performed at one or more of the computing devices 111, 113.

Figure 9:
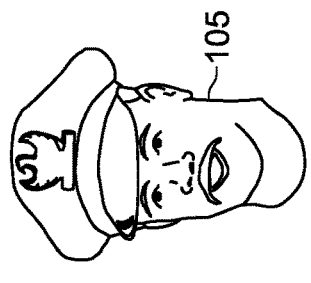
FIG. 9 depicts interfaces for selecting a tactical intercept maneuver from a plurality of tactical intercept maneuvers in accordance with some embodiments.
Figure 9:
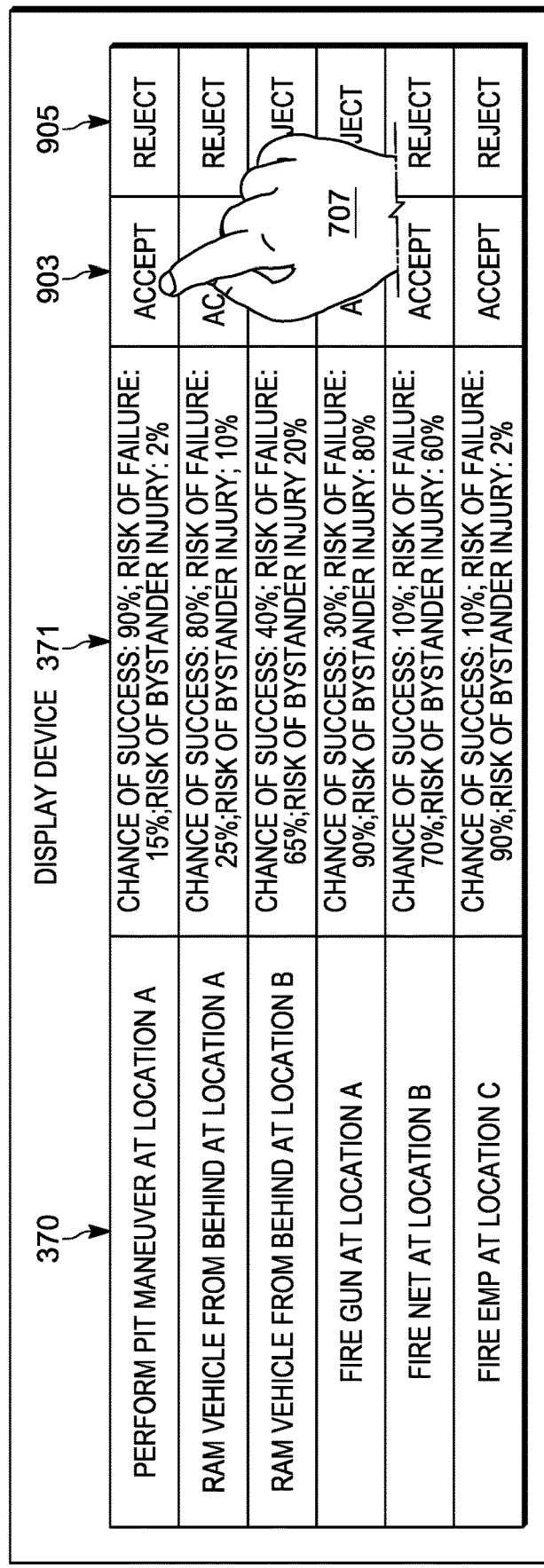

Attention is next directed to FIG. 9, which depicts an alternative example embodiment of the blocks 206, 210, 214 of the method 200. In particular, FIG. 9 depicts an example interface 901 that may be provided at the display device 126 at the first vehicle 101, for example at the block 210 of the method 200 to provide guidance to an operator of the first vehicle 101, such as the responder 105, to perform a tactical intercept maneuver. Again, it is assumed in FIG. 9 that the display device 126 includes a touch screen, and the like, as an input device. The interface 901 may be used to select and/or accept, or reject, one of a plurality of tactical intercept maneuvers. It is hence assumed in FIG. 9 that the tactical driving computing device 113 has determined the plurality of tactical intercept maneuvers 370 and the associated risk factors 371, and further transmitted the plurality of tactical intercept maneuvers 370 and the associated risk factors 371 to the vehicle computing device 111. Hence, the interface 901 is similar to FIG. 4.

The interface 901 may be selected via a menu system, and the like, at the display device 126 and/or automatically provided when plurality of tactical intercept maneuvers 370 and the associated risk factors 371 is received from the tactical driving computing device 113.

Each of the tactical intercept maneuvers 370 is provided with respective selectable options 903, 905 for respectively accepting or rejecting a tactical intercept maneuver 370. As depicted, the selectable options 903, 905 include virtual buttons, and the like, but the selectable options 903, 905 may be in any format for accepting or rejecting a respective tactical intercept maneuver. The responder 105 may use the finger of their hand 707 to interact with the selectable options 903, 905 via the touch screen of the display device 126 to accept or reject a respective tactical intercept maneuver. Once one of the tactical intercept maneuvers 370 are selected, the remainder may be designated as rejected. However, tactical intercept maneuvers 370 may be rejected via the selectable options 905, for example prior to selection of a tactical intercept maneuver 370.

Alternatively, a tactical intercept maneuver 370 may be selected/accepted or rejected using voice commands received at a microphone of the first vehicle 101. For example, the speaker 128 may be controlled by the controller 120 to "play" guidance 401 for one or more of the tactical intercept maneuvers 370, and the responder 105 may issue a voice interaction and/or a voice command 899 for accepting (or rejecting) a tactical intercept maneuver 370 which is received by controller 130 via the microphone 199. In some embodiments, the speaker 128 may be controlled to "play" only guidance for a highest ranked tactical intercept maneuver 370 and/or a top given number of tactical intercept maneuvers 370, for example a top three tactical intercept maneuvers 370, as there may not be enough time for the responder 105 to hear all the tactical intercept maneuvers 370 prior to a tactical intercept maneuver 370 being performed.

Hence, the selection of a tactical intercept maneuver 370 from a plurality of tactical intercept maneuvers 370 at the block 206 may at least partially occur at the vehicle computing device 111. Furthermore, the block 206 may be combined with the block 214, as selection of a selectable option 903 further indicates a "YES" decision at the block 214.

In yet further embodiments, an indication of a tactical intercept maneuver being selected (or rejected) may be transmitted from the vehicle computing device 111 to the tactical driving computing device 113. In these embodiments, the tactical driving computing device 113 may transmit the guidance with a plurality of tactical intercept maneuvers, but may not transmit the control instructions until receipt of an indication that a tactical intercept maneuver is selected. Hence, the block 206 may be performed at one or more of the computing devices 111, 113.

Figure 10:
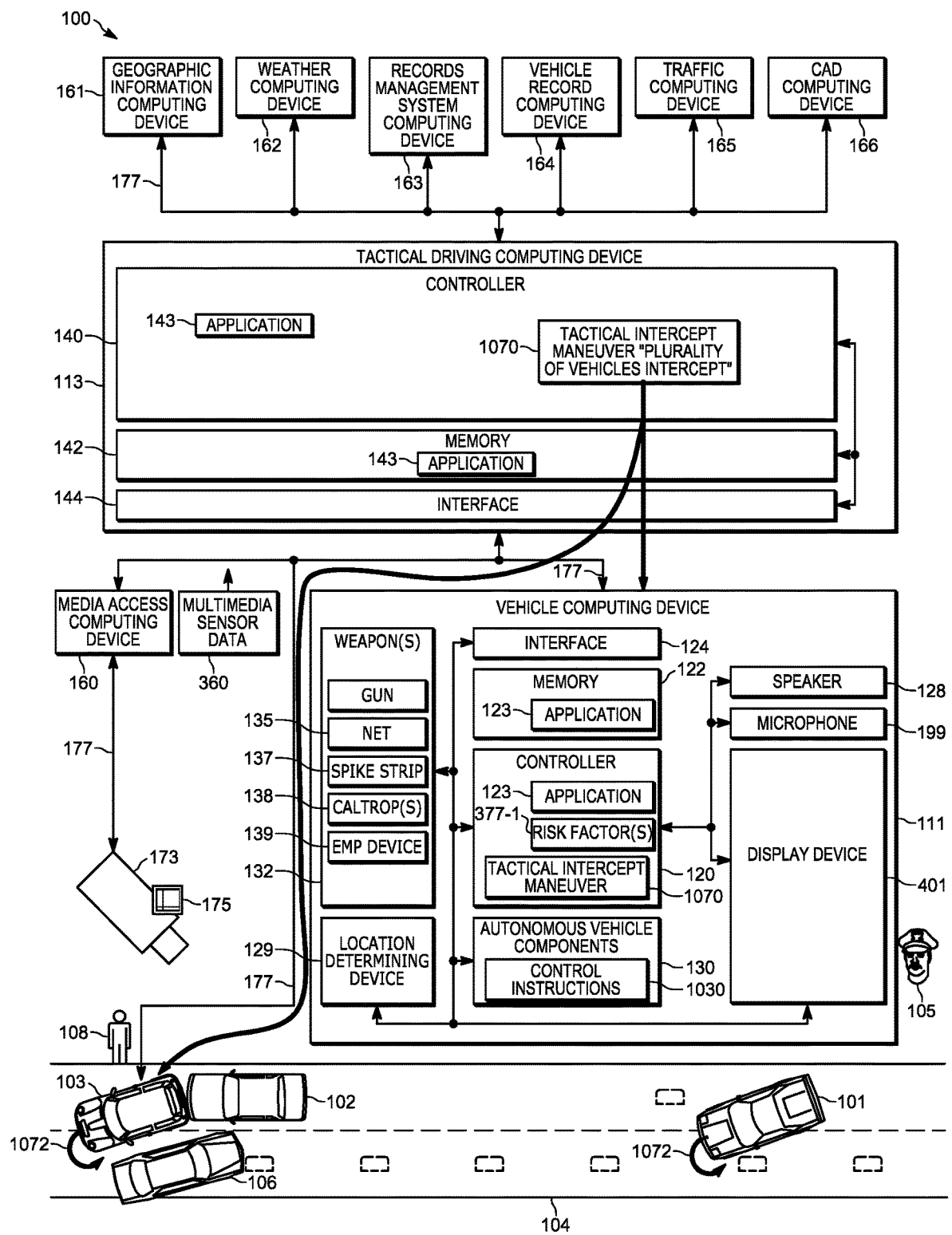
FIG. 10 depicts a tactical intercept maneuver being autonomously implemented at a plurality of vehicles in the system of FIG. 1 in accordance with some embodiments.

Attention is next directed to FIG. 10 which depicts yet a further embodiment of the method 200, in which a selected tactical intercept maneuver 1070 comprises controlling a plurality of vehicles, including the first vehicle 101 and, for example the third vehicle 103, to intercept the second vehicle 102. While not depicted, it is assumed that risk factors for the tactical intercept maneuver 1070 are generated, and furthermore that the tactical intercept maneuver 1070 has been selected from a plurality of tactical intercept maneuvers as described above, automatically at the tactical driving computing device 113 and/or via a selection and/or acceptance of the tactical intercept maneuver 1070 at the first vehicle 101 (or the third vehicle 103).

As depicted, the tactical intercept maneuver 1070 corresponds to each of the first vehicle 101 and the third vehicle 103 being autonomously controlled to stop suddenly and turn (as represented by the arrows 1072) to block escape paths of the second vehicle 102, for example in a coordinated roadblock; as depicted, the tactical intercept maneuver 1070 has resulted in the third vehicle 103 physically intercepting the second vehicle 102. As depicted, the vehicle computing device 113 of the first vehicle 101 is implementing control instructions 1030 of the tactical intercept maneuver 1070; it is assumed that a vehicle computing device of the third vehicle 103 is implementing similar control instructions, but customized for the third vehicle 103.

However, other types of tactical intercept maneuvers that include a plurality of vehicles being autonomously controlled are within the scope of the present specification, including, but not limited to, coordinating a high-speed chase of the second vehicle 102 by the plurality of vehicles 101, 103, ramming the second vehicle 102 from behind and/or from a side by one or more of the plurality of vehicles 101, 103, firing weapons at one or more of the plurality of vehicles 101, 103, and the like.

In contrast to the tactical intercept maneuver 370-1 depicted in FIG. 5, however, the tactical intercept maneuver 1070 has resulted in the bystander vehicle 106 being involved in the interception and/or damaged. Such an involvement of the bystander vehicle 106 may be provided to the tactical driving computing device 113 as feedback data, similar to the feedback data 601 to improve generation of risk factors for a similar tactical intercept maneuver in the future.

Provided herein is a system, device and method for autonomous tactical vehicle control in which context data, and the like, from computing devices and/or sensors external to a first vehicle are used to determine a plurality of tactical intercept maneuvers along with associated risk factors, when pursuing a second vehicle. A tactical intercept maneuver is selected having a best chance of success and/or a best chance of not injuring a bystander and/or not damaging property. The selected tactical intercept maneuver may then be autonomously performed by the first vehicle, and/or a plurality of vehicle, to intercept the second vehicle.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A computing device comprising:
a controller, and a communication interface, the computing device associated with a first vehicle, the controller configured to:
receive, using the communication interface, data associated with a second vehicle pursued by the first vehicle;
determine, using the data associated with the second vehicle, a plurality of tactical intercept maneuvers and respective risk factors associated with the plurality of tactical intercept maneuvers;
select a tactical intercept maneuver, from the plurality of tactical intercept maneuvers, based on the respective risk factors; and,
one or more of:
cause the first vehicle to autonomously perform the tactical intercept maneuver; and,
cause a notification device at the first vehicle to provide guidance for an operator of the first vehicle to perform the tactical intercept maneuver using the first vehicle.

2. The computing device of claim 1, wherein the data associated with the second vehicle comprises one or more of: context data associated with the second vehicle; incident data associated with a pursuit of the second vehicle; driver data associated with a driver of the second vehicle; criminal data associated with the driver of the second vehicle; driver data associated with the driver of the second vehicle; vehicle data associated with the second vehicle; a type of the second vehicle; location data associated with a location of the second vehicle; multimedia sensor data associated with the location of the second vehicle; traffic data of the location of the second vehicle; geographic information systems data associated with a location of the second vehicle; and weather data indicative of current weather at the location of the second vehicle.

3. The computing device of claim 1, wherein the controller is further configured to receive the data associated with the second vehicle from one or more of: one or more computing devices external to the first vehicle; a records management system computing device external to the first vehicle; a computer-aided dispatch computing device external to the first vehicle; a geographic information system computing device external to the first vehicle; a weather computing device external to the first vehicle; a police record computing device external to the first vehicle; a vehicle record computing device external to the first vehicle; a traffic computing devices; and one or more sensors external to the first vehicle.

4. The computing device of claim 1, wherein the controller is further configured to:
cause the notification device to provide an indication of the tactical intercept maneuver with selectable options for accepting or rejecting the tactical intercept maneuver; and,
cause the first vehicle to autonomously perform the tactical intercept maneuver only when a selectable option for accepting the tactical intercept maneuver is accepted.

5. The computing device of claim 1, wherein the respective risk factors are based on one or more of: the data associated with the second vehicle; a location of the second vehicle; traffic data indicative of traffic in the location of the second vehicle; and multimedia sensor data indicative of bystanders at the location of the second vehicle.

6. The computing device of claim 1, wherein the controller is further configured to:
determine the plurality of tactical intercept maneuvers and the respective risk factors using one or more of:
a generalized linear regression algorithm;
a random forest algorithm;
a support vector machine algorithm;
a gradient boosting regression algorithm;
a decision tree algorithm; and
a generalized additive model.

7. The computing device of claim 1, wherein the controller is further configured to:
determine a location to implement the tactical intercept maneuver; and, one or more of:
cause the first vehicle to autonomously perform the tactical intercept maneuver at the location; and,
cause the notification device to provide at the first vehicle, the guidance for the operator prior to the first vehicle arriving at the location.

8. The computing device of claim 1, wherein the tactical intercept maneuver comprises controlling the first vehicle to one or more of: physically intercept the second vehicle; ram the second vehicle; stop in front of the second vehicle; and perform a pursuit intervention technique maneuver.

9. The computing device of claim 1, wherein the tactical intercept maneuver comprises controlling the first vehicle to fire, towards the second vehicle, one or more of: a weapon, a gun, a net, a spike strip, caltrops, and an electromagnetic pulse from an electromagnetic pulse device.

10. The computing device of claim 1, wherein the tactical intercept maneuver comprises controlling a plurality of vehicles, including the first vehicle, to intercept the second vehicle.

11. A method comprising:
receiving, at a controller of a computing device associated with a first vehicle, data associated with a second vehicle pursued by the first vehicle;
determining, at the controller, using the data associated with the second vehicle, a plurality of tactical intercept maneuvers and respective risk factors associated with the plurality of tactical intercept maneuvers;
selecting, at the controller, a tactical intercept maneuver, from the plurality of tactical intercept maneuvers, based on the respective risk factors; and,
one or more of:
causing, using the controller, the first vehicle to autonomously perform the tactical intercept maneuver; and, causing, using the controller, a notification device at the first vehicle, to provide guidance for an operator of the first vehicle to perform the tactical intercept maneuver using the first vehicle.

12. The method of claim 11, wherein the data associated with the second vehicle comprises one or more of: context data associated with the second vehicle; incident data associated with a pursuit of the second vehicle; driver data associated with a driver of the second vehicle; criminal data associated with the driver of the second vehicle; driver data associated with the driver of the second vehicle; vehicle data associated with the second vehicle; a type of the second vehicle; location data associated with a location of the second vehicle; multimedia sensor data associated with the location of the second vehicle; traffic data of the location of the second vehicle; geographic information systems data associated with a location of the second vehicle; and weather data indicative of current weather at the location of the second vehicle.

13. The method of claim 11, wherein the data associated with the second vehicle is received from one or more of: one or more computing devices external to the first vehicle; a records management system computing device external to the first vehicle; a computer-aided dispatch computing device external to the first vehicle; a geographic information system computing device external to the first vehicle; a weather computing device external to the first vehicle; a police record computing device external to the first vehicle; a vehicle record computing device external to the first vehicle; a traffic computing devices; and one or more sensors external to the first vehicle.

14. The method of claim 11, further comprising:
causing the notification device to provide to an indication of the tactical intercept maneuver with selectable options for accepting or rejecting the tactical intercept maneuver; and,
causing the first vehicle to autonomously perform the tactical intercept maneuver only when a selectable option for accepting the tactical intercept maneuver is accepted.

15. The method of claim 11, wherein the respective risk factors are based on one or more of: the data associated with the second vehicle; a location of the second vehicle; traffic data indicative of traffic in the location of the second vehicle; and multimedia sensor data indicative of bystanders at the location of the second vehicle.

16. The method of claim 11, further comprising:
determining, at the controller, the plurality of tactical intercept maneuvers and the respective risk factors using one or more of:
a generalized linear regression algorithm;
a random forest algorithm;
a support vector machine algorithm;
a gradient boosting regression algorithm;
a decision tree algorithm; and
a generalized additive model.

17. The method of claim 11, further comprising:
determining, at the controller, a location to implement the tactical intercept maneuver; and, one or more of:
causing, using the controller, the first vehicle to autonomously perform the tactical intercept maneuver at the location; and,
causing, using the controller, the notification device to provide at the first vehicle, the guidance for the operator prior to the first vehicle arriving at the location.

18. The method of claim 11, wherein the tactical intercept maneuver comprises controlling the first vehicle to one or more of: physically intercept the second vehicle; ram the second vehicle; stop in front of the second vehicle; and perform a pursuit intervention technique maneuver.

19. The method of claim 11, wherein the tactical intercept maneuver comprises controlling the first vehicle to fire, towards the second vehicle, one or more of: a weapon, a gun, a net, a spike strip, caltrops, and an electromagnetic pulse from an electromagnetic pulse device.

20. The method of claim 11, wherein the tactical intercept maneuver comprises controlling a plurality of vehicles, including the first vehicle, to intercept the second vehicle.

* * * * *